(12) United States Patent
Singh et al.

(10) Patent No.: US 7,904,777 B2
(45) Date of Patent: Mar. 8, 2011

(54) METHOD AND SYSTEM FOR GENERATING BLOCK ACKNOWLEDGEMENTS IN WIRELESS COMMUNICATIONS

(75) Inventors: Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1100 days.

(21) Appl. No.: 11/598,983

(22) Filed: Nov. 13, 2006

(65) Prior Publication Data

US 2007/0186134 A1    Aug. 9, 2007

Related U.S. Application Data

(60) Provisional application No. 60/761,530, filed on Jan. 24, 2006.

(51) Int. Cl.
    *H04L 1/18*    (2006.01)

(52) U.S. Cl. ......... 714/749; 370/474; 370/477; 714/748; 714/750; 714/752

(58) Field of Classification Search .................... None
See application file for complete search history.

(56) References Cited

U.S. PATENT DOCUMENTS

| | | | |
|---|---|---|---|
| 7,675,911 | B2 | 3/2010 | Singh et al. |
| 2006/0018332 | A1 | 1/2006 | Kakani et al. |
| 2006/0034274 | A1* | 2/2006 | Kakani et al. ............... 370/389 |
| 2006/0092871 | A1* | 5/2006 | Nishibayashi et al. ....... 370/328 |
| 2006/0104300 | A1* | 5/2006 | Ho ............................ 370/428 |
| 2007/0230493 | A1 | 10/2007 | Dravida et al. |
| 2008/0130538 | A1 | 6/2008 | Raissinia et al. |
| 2008/0181251 | A1* | 7/2008 | Nishibayashi et al. ....... 370/445 |

OTHER PUBLICATIONS

"Amendment: Wireless LAN MAC and PHY specifications: Enhancement for Higher Throughputs," IEEE P802.11,/D1.0, Mar. 2006.
OPNET Technologies, Inc.; http://www.opnet.com; downloaded Jan. 7, 2008.
Stephens, A., Coffey S., "Joint Proposal: High throughput extension to the 802.11 Standard: MAC," 11-05-1095-02-000n, Nov. 16, 2005.
Stephens, A.P. et al, IEEE 802 11-03/802R23, TGn Usage Models, May 11, 2004.
IEEE P802.11e/D13.0, "Amendment: Medium Access Control (MAC) Quality of Service (QoS) Enhancements," Jan. 2005. United States.
U.S. Non-final Office Action for Appl. No. 11/713,311 mailed Jun. 24, 2009 by Examiner Clemence Han.
U.S. Notice of Allowance for Appl. No. 11/713,311 mailed Dec. 14, 2009 by Examiner Clemence Han.

* cited by examiner

*Primary Examiner* — Charles N Appiah
*Assistant Examiner* — Mazda Sabouri
(74) *Attorney, Agent, or Firm* — Kenneth L. Sherman, Esq.; Michael Zarrabian, Esq.; Myers Andras Sherman & Zarrabian LLP

(57) ABSTRACT

The present invention provides a method and a system for generating a block acknowledgment for aggregated MSDUs (A-MSDU) transmitted from a sender to a receiver over a wireless channel. Upon receiving the A-MSDU, the receiver generates a MSDU Block Acknowledgment (MSDU-BA) that includes an acknowledgment for each received MSDU. Based on the MSDU-BA, the sender selectively retransmits only the erroneous MSDU(s) to the receiver.

77 Claims, 21 Drawing Sheets

The receiver sends a BA indicating the status of each MPDU

25

100

150

400

500

METHOD AND SYSTEM FOR GENERATING BLOCK ACKNOWLEDGEMENTS IN WIRELESS COMMUNICATIONS

RELATED APPLICATION

This application claims the benefit of U.S. Provisional Patent Application Ser. No. 60/761,530, filed on Jan. 24, 2006, incorporated herein by reference.

FIELD OF THE INVENTION

The present invention relates to wireless communications, and in particular, to a method of generating block acknowledgments in wireless communications.

BACKGROUND OF THE INVENTION

In many wireless communication systems including one or more transmitters and one or more receivers, a frame structure is used for data transmission between a transmitter and a receiver. For example, the IEEE 802.11 standard uses frame aggregation in a Media Access Control (MAC) layer and a physical (PHY) layer.

In a typical wireless transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., a PHY preamble) thereto to construct a PHY Protocol Data Unit (PPDU). The PHY header includes parameters for determining a transmission scheme including a coding/modulation scheme.

The IEEE 802.11 Task Group n (TGn) provides a high data rate wireless local area network (WLAN) standard (the IEEE 802.11n) which allows a maximum throughput of at least 100 Mbps (at the MAC layer). One TGn specification (IEEE P802.11n/D1.0 (March 2006), "Amendment: Wireless LAN MAC and PHY specifications: Enhancement for Higher Throughputs"), incorporated herein by reference) provides two types of aggregation schemes, Aggregated MSDU (A-MSDU and Aggregated MPDU (A-MPDU), for communication between a wireless sender (a data transmitter) and a wireless receiver (a data receiver).

FIG. 1 shows the structure of a MPDU 10 including an A-MSDU 12 as a payload. The A-MSDU 12 includes multiple MSDUs 14 joined together to create a single larger MSDU that is transported in the MPDU 10. Thus, the A-MSDU 12 aggregates the multiple MSDUs 14 for transmission of a receiver in a single MPDU 10. This improves the efficiency of the MAC layer, particularly when there are many small MSDUs 14 such as VoIP packets or TCP acknowledgements.

FIG. 2 shows the structure of an A-MPDU 20 which aggregates multiple MPDUs 10 together and transports them in a single PSDU 22 (Physical Layer Convergence Procedure (PLCP) Service Data Unit). In the PSDU 22, the MPDUs 10 are separated by the MPDU delimiters 24.

FIG. 3 shows an example of a wireless communication scenario 25 between a sender and a receiver using an A-MPDU scheme. The sender transmits an A-MPDU 20 and a Block Acknowledgement Request (BAR) 26 to the receiver over a wireless channel. In this example, the A-MPDU 20 can aggregate a maximum of 64 MPDUs 10. Upon receipt of the A-MPDU 20 followed by the BAR 26, the receiver generates a Block Acknowledgement (BA) 28 which indicates the receipt status of each MPDU 10 in the A-MPDU 20. The receiver then transmits the BA 28 to the sender. The BA 28 can include positive acknowledgments (Ack) or negative acknowledgments (Nack) for the MPDUs 10 in the received A-MPDU 20.

It is possible for a MPDU 10 to include an A-MSDU 12. However, because the acknowledgment in the BA 28 is per MPDU basis, the receiver has no means to acknowledge different MSDUs 14 (or sub frames of an A-MSDU 12) in a MPDU 10.

FIGS. 4A-B illustrate examples of conventional scenarios of using A-MSDUs within an A-MPDU sequence. In FIG. 4A, the sender transmits an A-MPDU 20 including multiple MPDUs 10 (i.e., MPDU0, ..., MPDU63), wherein each MPDU 10 includes an A-MSDU 12 including multiple MSDUs 14 (i.e., MSDU0, ..., MSDU3). The sender also transmits a BAR 26 for the A-MPDU 20. The receiver receives MSDU0 (i.e., the first MSDU (or sub frame) of MPDU0) in error. Since the receiver cannot selectively request for the retransmission of the erroneous MSDU0, the receiver requests for the retransmission of the entire MPDU0 with a Nack. FIG. 4B shows retransmission of the A-MSDU 12, including all of the MSDUs in the MPDU0 by the sender. However this time, MSDU3 in MPDU0 is received in error. Again, since the receiver cannot selectively request for the retransmission of the erroneous MSDU3, the receiver requests for the retransmission of the entire MPDU0 with a Nack. This process continues until all of the MSDUs of an A-MSDU are correctly acknowledged or the sender reaches a maximum retransmit limit. This retransmission of error-free MSDUs is highly inefficient. Moreover, the apparent benefit of aggregation decreases as the packet loss rate increases.

BRIEF SUMMARY OF THE INVENTION

The present invention provides a method and a system for generating a block acknowledgment for aggregated MSDUs (A-MSDU) transmitted from a sender to a receiver over a wireless channel. In one embodiment, the present invention provides a block acknowledge scheme comprising a MSDU Block Acknowledgment (MSDU-BA) scheme wherein, upon receiving an A-MSDU and a block acknowledgment request (BAR) from the sender, the receiver acknowledges individual MSDUs with a block acknowledge comprising a MSDU-BA. Based on the MSDU-BA, the sender selectively retransmits only the erroneous MSDU(s) to the receiver.

The MSDU-BA includes a plurality of acknowledgments corresponding to a plurality of MSDUs in a received A-MSDU. The sender selectively retransmits each MSDU that requires retransmission as indicated by the corresponding acknowledgment in the MSDU-BA.

In accordance with further features of the present invention, each A-MSDU comprises a sequence of MSDUs that are A-MSDU-Size in number. Each MSDU in an A-MSDU has a sequence number starting from 0 to A-MSDU-Size—1 that uniquely identifies that MSDU in the A-MSDU. The A-MSDU includes a MSDU sequence number subfield for each MSDU, allowing the receiver to uniquely identify that MSDU in the A-MSDU. Further, the A-MSDU includes a CRC subfield for each MSDU, allowing the receiver to check for successful receipt of that MSDU. The MSDU-BA comprises a Block Acknowledgement bitmap field that includes a plurality of acknowledgment bits corresponding to said plurality of MSDUs.

In accordance with further embodiments of the present invention, generating a MSDU-BA further includes processing the received A-MPDU to access each MPDU therein, and for each MPDU including an A-MSDU, using a bit in the Block ACK bitmap field to indicate to the sender whether the corresponding MSDU is successfully received or not. The number of bits in the Block Acknowledgement bitmap field is A-MSDU-Size. The BAR includes a size subfield indicating the A-MSDU-Size for the corresponding A-MPDU. The size subfield comprises reserved bits of a BAR control field in the BAR for indicating said A-MSDU-Size.

In accordance with further embodiments of the present invention, generating a MSDU-BA further includes the steps of, for each MSDU, using the corresponding sequence number of the MSDU to indicate the acknowledgment for that MSDU to the sender in the MSDU-BA.

In accordance with further embodiments of the present invention, the Block Acknowledgement bitmap field in a MSDU-BA for an A-MPDU has a variable length based on the A-MSDU-Size indicated in the BAR corresponding to that A-MPDU. Further, the BAR includes a signaling subfield based on which the receiver transmits a MSDU-BA to the sender instead of a normal BA. The signaling subfield is a compressed BA subfield, in a BAR control field of the BAR.

These and other features, aspects and advantages of the present invention will become understood with reference to the following description, appended claims and accompanying figures.

DETAILED DESCRIPTION OF THE INVENTION

The present invention provides a method and a system for generating a BA for an A-MPDU comprising multiple A-MSDUs, in wireless communication systems such as an IEEE 802.11n WLAN, including a wireless sender and a wireless receiver. In one embodiment, the present invention provides a block acknowledge scheme comprising a MSDU-BA scheme for use in conjunction with an A-MPDU. Based on the MSDU-BA scheme, upon receiving an A-MPDU and a BAR from the sender, the receiver acknowledges individual MSDUs with a block acknowledge comprising a MSDU-BA. Based on the MSDU-BA, the sender selectively retransmits only the erroneous MSDU(s) to the receiver.

According to the MSDU-BA scheme, the sender uses a BAR frame for MSDU-BA signaling (and other information), so that the receiver can reply with a MSDU-BA frame, as described below.

Figure 5:
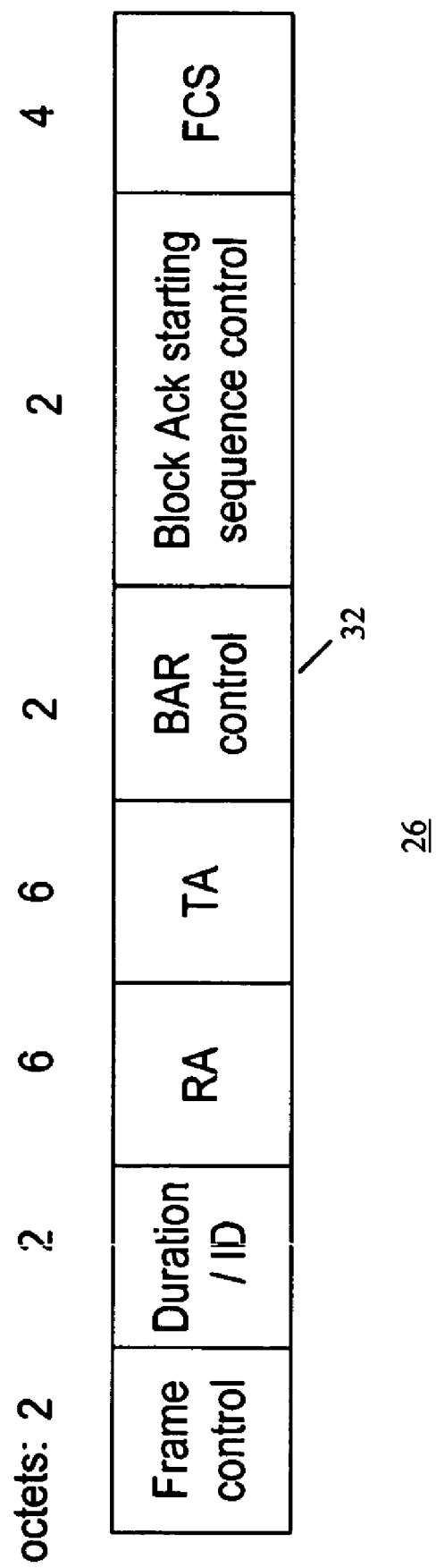
FIG. 5 shows a conventional Block Acknowledgement Request (BAR) frame format according to the aforementioned IEEE 802.11n specification.

FIG. 5 shows the frame format of a conventional BAR frame 26; including a BAR control subfield 32, among other subfields. In the MSDU-BA scheme, the content and interpretation of various subfields of the BAR frame 26 is similar to the conventional approaches, except for the BAR control subfield 32. In the MSDU-BA scheme, the BAR control subfield 32 is modified to: (1) allow the sender to signal the receiver to use the MSDU-BA scheme so that the receiver can transmit a MSDU-BA to the sender rather than a conventional BA, and (2) indicate the exact size of the A-MSDU (i.e., the A-MSDU-Size) which is the number of MSDUs that can be aggregated in one A-MSDU.

Figure 6:
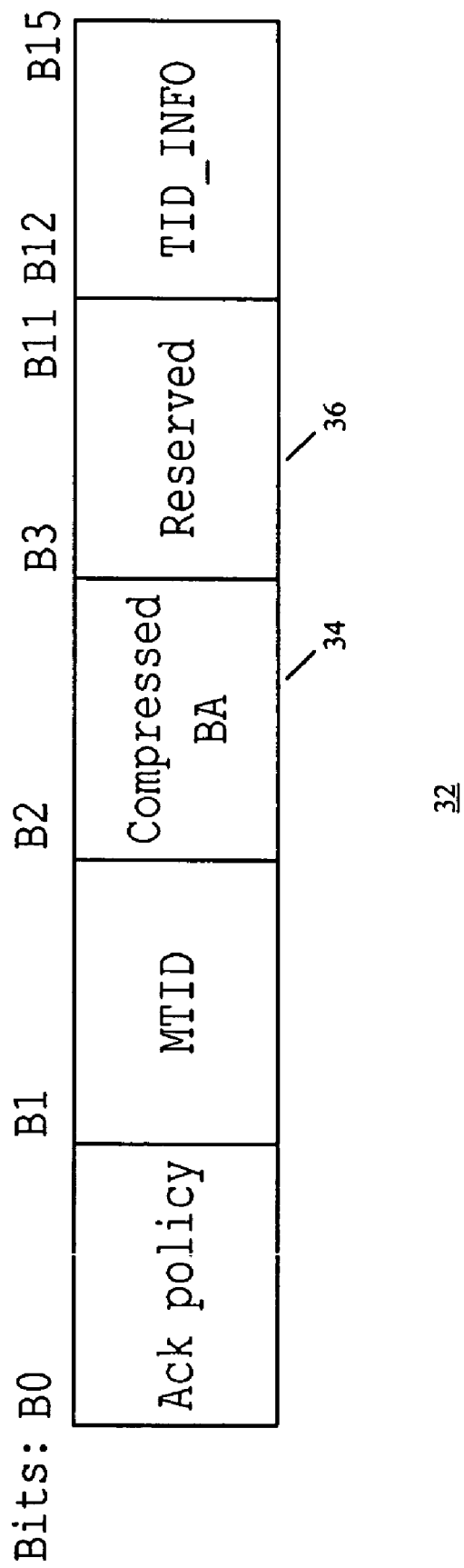
FIG. 6 shows a conventional BAR control subfield format according to the aforementioned IEEE 802.11n specification.

FIG. 6 shows details of the conventional BAR control subfield 32, including a compressed BA subfield 34 and a reserved subfield 36, among other subfields. Table 1 below shows the structure and interpretation of the conventional compressed BA subfield 34.

TABLE 1

Interpretation of the compressed BA subfield

| Compressed BA | BitMap size (byte) | Bitmap interpretation | Comments |
| --- | --- | --- | --- |
| 0 | 128 | Legacy 802.11e interpretation | N/A for HT devices |
| 1 | 8 | Each bit set acknowledges the successful reception of a single MSDU in order of sequence number | Mandatory No fragmentation |

Figure 7:
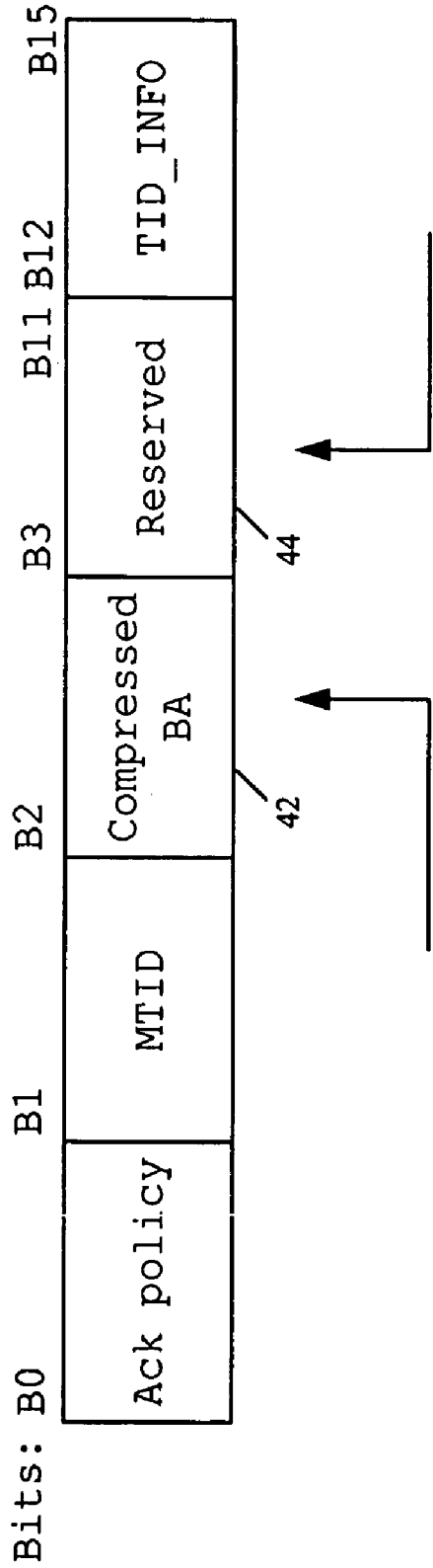
FIG. 7 shows a BAR control subfield in a MSDU Block Acknowledgement (MSDU-BA) scheme, according to an embodiment of the present invention.

FIG. 7 shows a BAR control subfield 40 for a MSDU-BA scheme, according to the present invention. The BAR control subfield 40 includes 16 bits (i.e., B0, . . . , B15). FIG. 7 further shows the settings for the compressed BA subfield 42 (i.e., one bit B2) and the reserved subfield 44 (i.e., nine bits B3-B11). Since the compressed BA subfield 42 is always set to 1 for high throughput (HT) devices, according to said embodiment of the present invention, the compressed BA subfield 42 is set to 0 by the sender to signal the receiver to use the MSDU-BA scheme for acknowledging an A-MPDU. Furthermore, eight bits of the nine reserved bits in subfield 44 are utilized to indicate the A-MSDU-Size (e.g., 128). In addition, bit B2 (i.e., the compressed BA subfield) is copied to bit B11.

Figure 8:
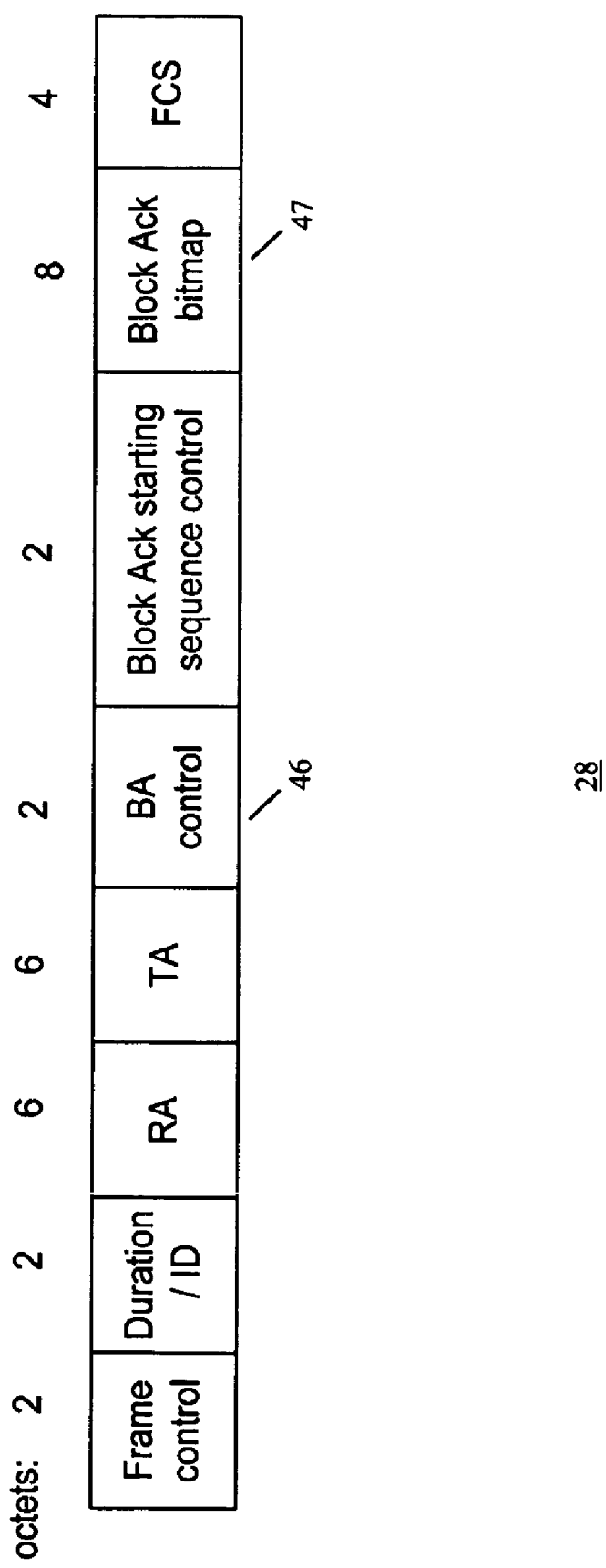
FIG. 8 shows a conventional BA frame format, according to the aforementioned IEEE 802.11n specification.
Figure 9:
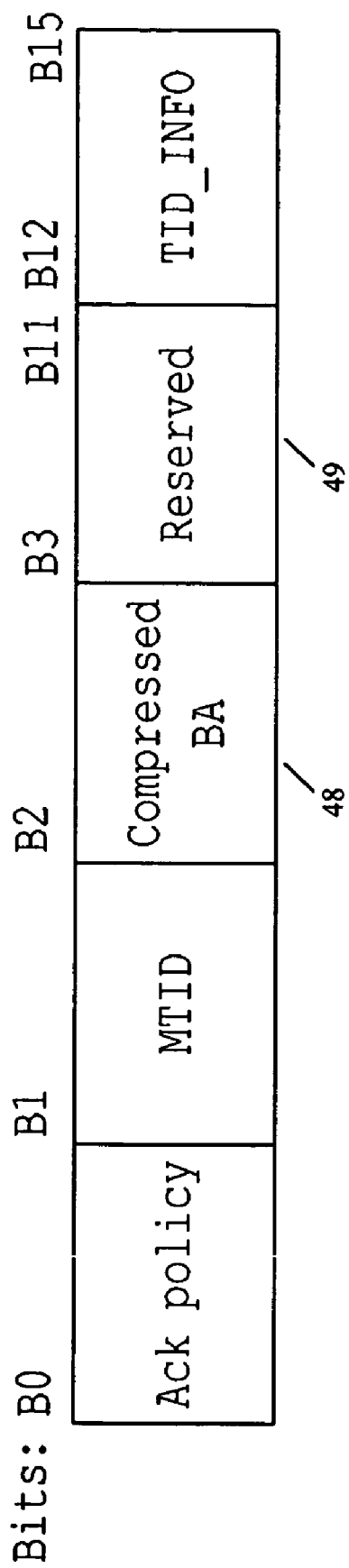
FIG. 9 shows a conventional BA control subfield format according to the aforementioned IEEE 802.11n specification.

FIG. 8 shows a conventional BA frame 28 used by a receiver in response to a conventional BAR frame, wherein the BA frame 28 includes a BA control subfield 46 and a Block Acknowledgement bitmap subfield 47, among other subfields. The Block Acknowledgement bitmap subfield 47 is 8 bits. FIG. 9 shows details of the BA control subfield 46 which is 16 bits (i.e., B0, . . . , B15), and includes a compressed BA subfield 48 (i.e., one bit B2) and a reserved subfield 49 (i.e., nine bits B3-B11), among other subfields.

Figure 10:
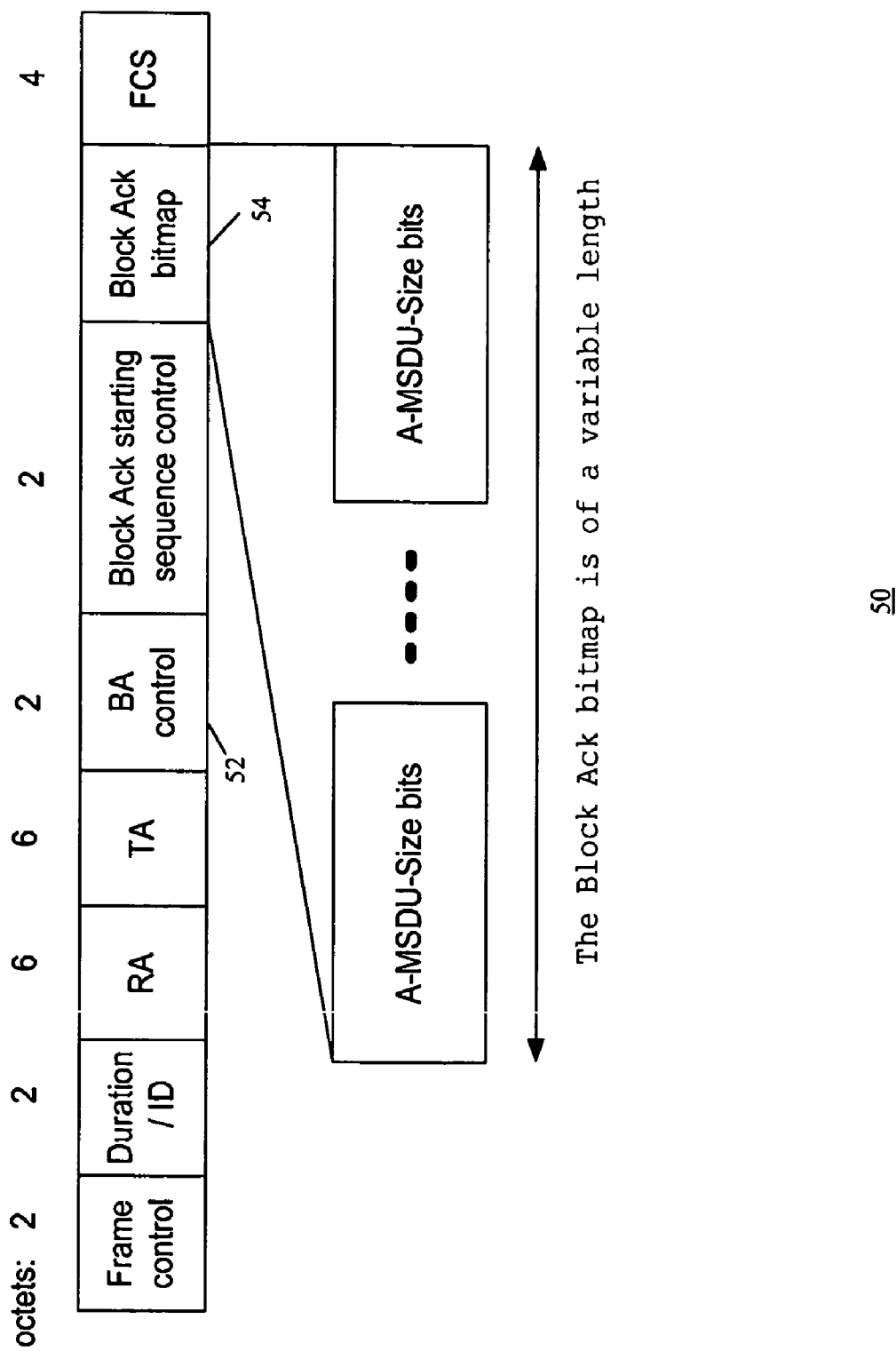
FIG. 10 shows a MSDU-BA frame format, according to an embodiment of the present invention.

FIG. 10 shows the frame format of a MSDU-BA 50, according to said embodiment of the present invention, including a modified BA control subfield 52 and a modified Block Acknowledgement bitmap subfield 54, among other subfields. In comparison with the conventional Block Acknowledgement bitmap subfield 47 in the BA frame 28 in FIG. 8, the modified Block Acknowledgement bitmap subfield 54 in the MSDU-BA 50 in FIG. 10 is of variable length (size). The length of the Block Acknowledgement bitmap subfield 54 is determined based on the A-MSDU-Size indicated in the BAR control subfield 40 (FIG. 7).

The A-MPDU sequence can have a maximum of 64 MPDUs aggregated together, and the maximum value of the A-MSDU-Size is 128, hence the maximum number of bits in the modified Block Acknowledgement bitmap subfield 54 is 64×128 bits=1024 octets. The first chunk of the A-MSDU-Size bits in the Block Acknowledgement bitmap subfield 54, starting from the Least Significant Bit (LSB), indicates the status of the MSDUs in the first MPDU in the A-MPDU, and so on and so forth.

Figure 11:
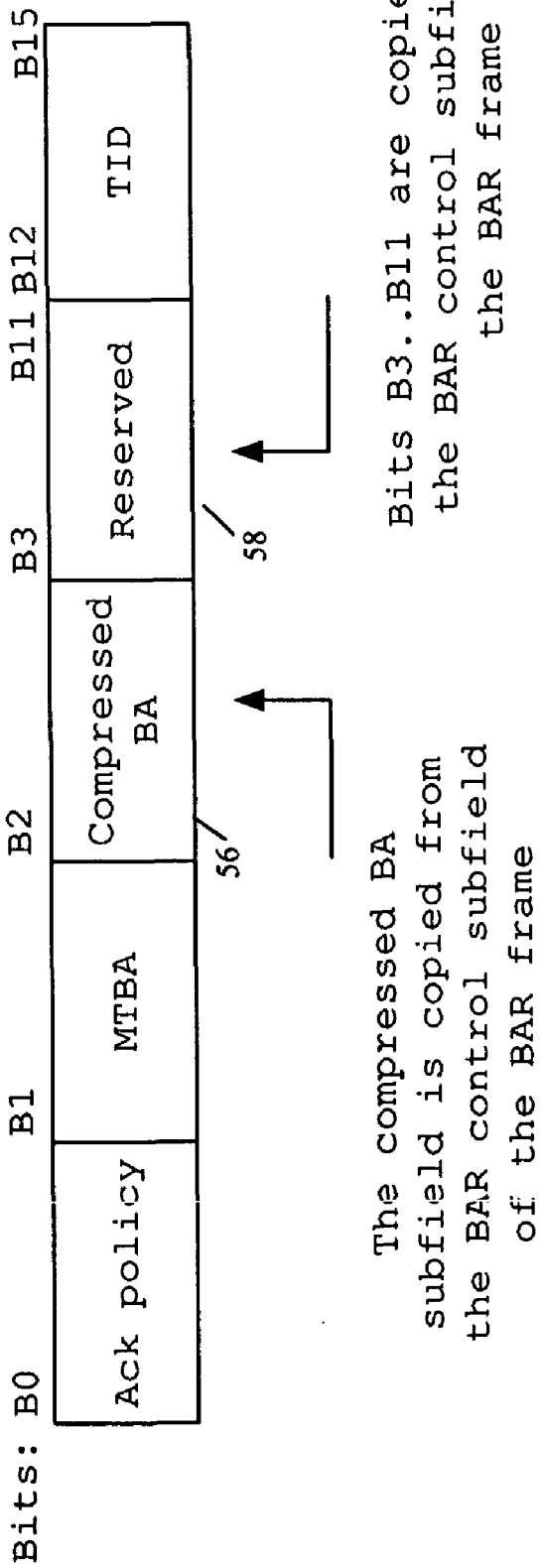
FIG. 11 shows a BA control subfield in a MSDU-BA, according to an embodiment of the present invention.

FIG. 11 shows details of the modified BA control subfield 54 are shown. The modified BA control subfield 54 is 16 bits (i.e., bits B0, . . . , B15), and includes a compressed BA subfield 56 (i.e., bit B2) and a reserved subfield 58 (i.e., bits B3-B11). In the BA control subfield 54, the compressed BA subfield 56 and the reserved subfield 58 are copied from the compressed BA subfield 42 and the reserved subfield 44, respectively, in the BAR control subfield 40 (FIG. 7) of the BAR received from the sender.

An example communication scenario in a communication system including wireless communication stations that implement a MSDU-BA scheme according to an embodiment of the present invention is now described.

Figure 12:
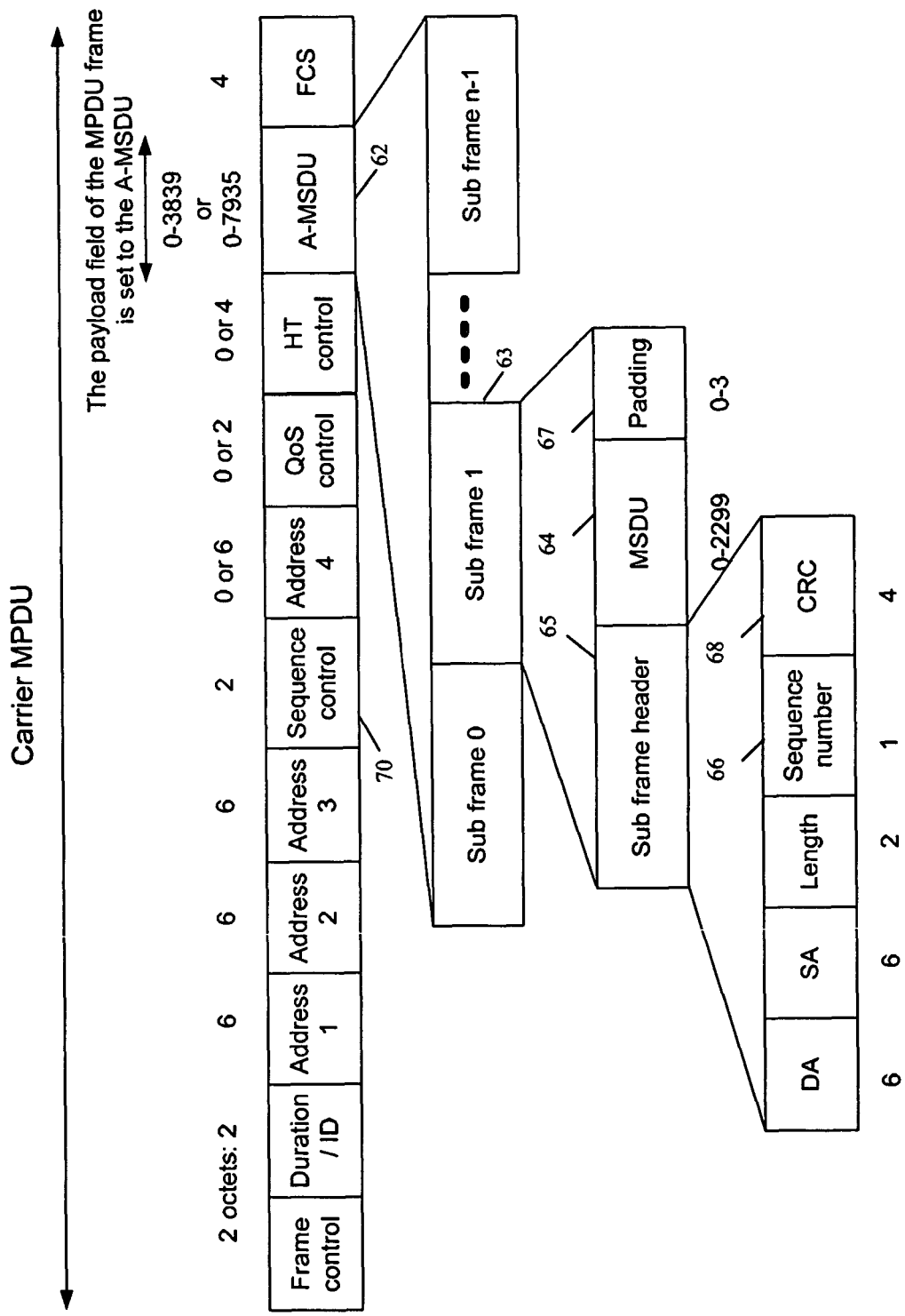
FIG. 12 shows an example MPDU including multiple MSDUs in an A-MSDU, wherein each MSDU has a sequence number, according to an embodiment of the present invention.

A wireless communication station (e.g., an access point (AP) or a station (STA)) that has the transmission opportunity (TXOP) for transmitting data over a wireless channel is referred to as a sender. The sender forms an A-MPDU that includes multiple MPDUs 60 as shown in FIG. 12. Each MPDU 60 comprises one A-MSDUs 62. Each A-MSDU 62 comprises multiple sub frames 63 (i.e., sub frame 0, . . . , sub frame n-1) wherein each sub frame 63 includes MSDUs 64 (i.e., the integer A-MSDU-Size the maximum number of MSDUs 64 in one A-MSDU 62). Furthermore, each MSDU 64 in an A-MSDU 62, includes a sequence number subfield 66 (ranging from 0 to A-MSDU-Size—1). The sequence number subfield 66 uniquely identifies each corresponding MSDU 64 within an A-MSDU 12. Since the maximum value of an A-MSDU-Size is 128, 8 bits (1 byte) are needed to represent sequence numbers from 0-127.

Figure 1:
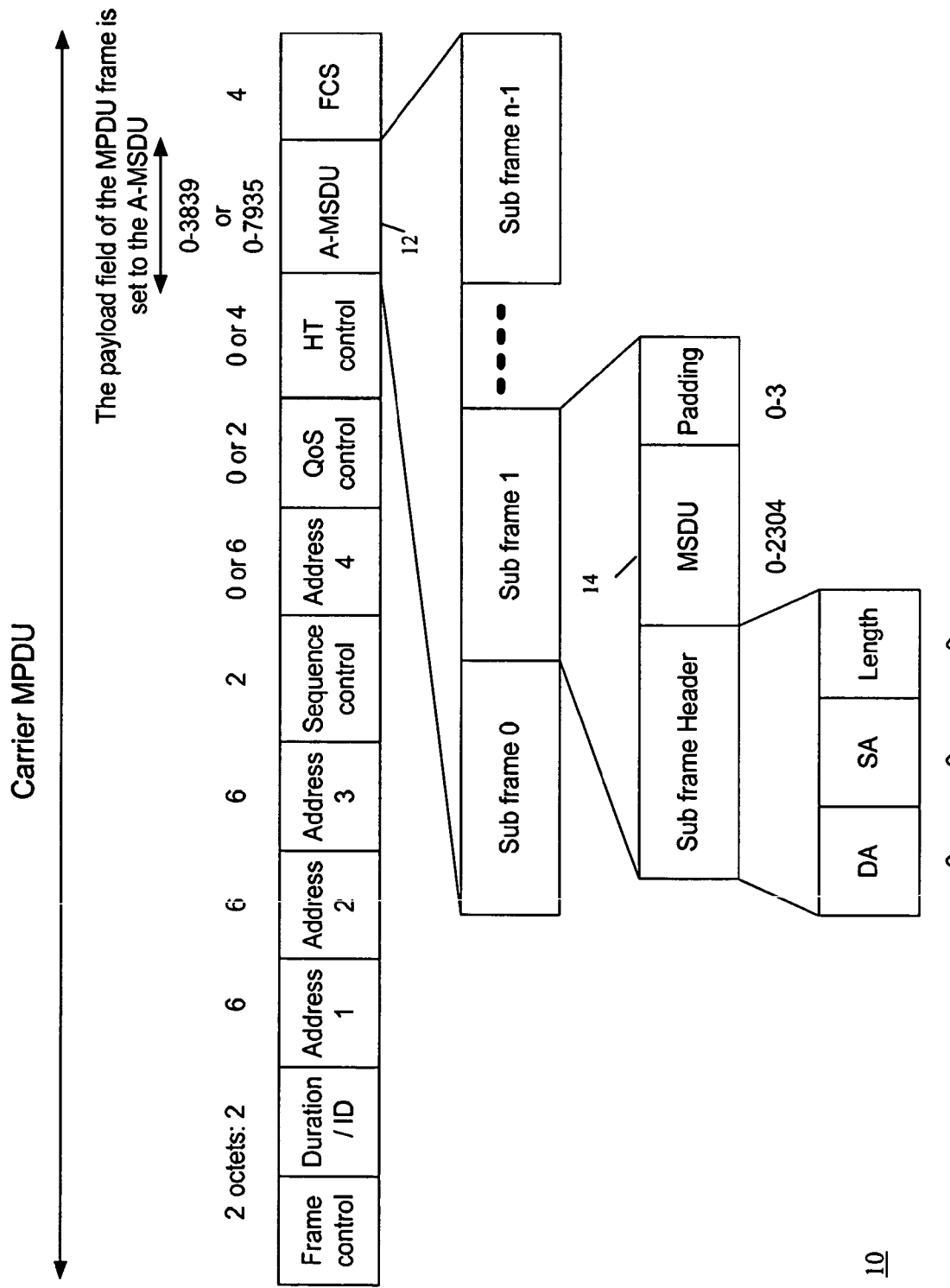
FIG. 1 shows a conventional A-MSDU frame format.

Compared to the conventional A-MSDU 12 in FIG. 1, the A-MSDU 62 in FIG. 12 is modified to accommodate the MSDU sequence number subfield 66 and a Cyclic Redundancy Checksum (CRC) subfield 68, according to the present invention. The CRC subfield 68 includes a 32-bit CRC (CRC-32) over the entire sub frame 63 including a sub frame header 65, the MSDU 64, and padding bits 67, if any. The CRC subfield 68 is used for error detection.

The multiple MSDUs 64 aggregated in a single A-MSDU frame 62 are transported in a carrier MPDU 60, as shown in FIG. 12. Each MPDU 60 also includes a monotonically increasing sequence number in a sequence control field 70, which allows for the MPDU 60 to be uniquely identified among other MPDUs aggregated in an A-MPDU that is transmitted to the receiver in a PSDU. The sender further transmits a BAR that includes a BAR control subfield 40 (FIG. 7) to the receiver.

Upon receiving the PSDU, the receiver decodes and processes the received PSDU that includes the A-MPDU that aggregates multiple MPDUs 60. The receiver constructs an MSDU-BA 50 (FIG. 10), wherein for each received MPDU 60 including an A-MSDU 62, the receiver uses one bit in A-MSDU-Size bits in the Block Acknowledgement bitmap subfield 54 of the MSDU-BA frame 50, to indicate whether that MSDU 62 is successfully received or not. In the Block Acknowledgement bitmap subfield 54, the bit zero, B0, starting from the LSB represents the receipt status (Ack/Nack) of the first MSDU 64 (as identified by the sequence number subfield 66 in FIG. 12) of the first MPDU 60 (as identified by the control sequence subfield 70) in an A-MPDU. Similarly, in the Block Acknowledgement bitmap subfield 54, the bit one, B1, starting from the LSB represents the receipt status (Ack/Nack) of the second MSDU 64 (as identified by the sequence number subfield 66 in FIG. 12) of the first MPDU 60 (as identified by the control sequence subfield 70) in an A-MPDU, and so on.

Based on the MSDU-BA 50, the sender selectively retransmits only the erroneous MSDU(s), as identified by the Block Acknowledgement bitmap subfield 54, to the receiver, according to the present invention.

It is possible that a MPDU 60 in an A-MPDU has less than the A-MSDU-Size number of MSDUs 64. In that case, the receiver sets the remaining bits (A-MSDU-Size—actual number of MSDUs 64 in a MPDU 60) in the corresponding A-MSDU-Size bits in the Block Acknowledgement bitmap 54 of the MSDU-BA 50 to 0.

The sender is free to include an A-MSDU (i.e., multiple MSDUs), or no A-MSDU (i.e., a single MSDU), in any MPDU of an A-MPDU. When an MPDU includes a single MSDU, the receiver sets the first bit, starting from the LSB, in the chunk of the A-MSDU-Size bits in the Block Acknowledgement bitmap 54, corresponding to that MPDU, to indicate the receipt status of the received MPDU. This is similar to generating an acknowledgement for the first MSDU of any A-MSDU. The receiver sets the remaining bits (A-MSDU-Size—1) in the chunk of the A-MSDU-Size bits in the Block Acknowledgement bitmap 54 to 0.

Accordingly, a bit in the Block Acknowledgement bitmap subfield 54 can be set to 0 in two scenarios: (1) to indicate that a corresponding MSDU is received in error which requires retransmission, and (2) to indicate a shorter A-MSDU. Because the sender knows the number of MSDUs aggregated in an A-MPDU, the sender can distinguish between the cases when a bit in the Block Acknowledgement bitmap subfield 54 is set to 0 when there is no MSDU, and when the MSDU is erroneous.

Figure 13A:
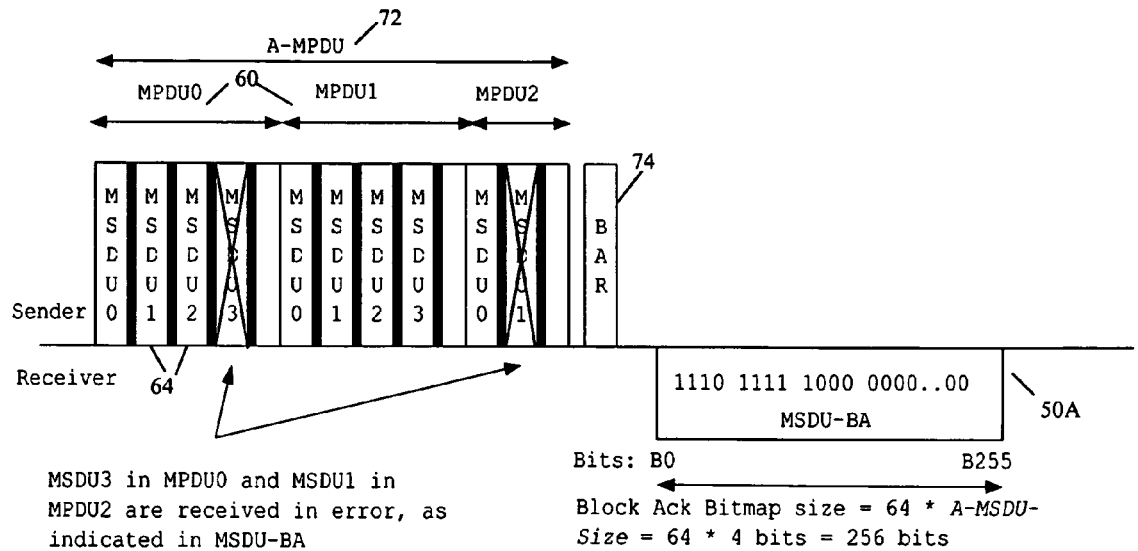
FIGS. 13A-B illustrate example MSDU-BA retransmission mechanisms, according to an embodiment of the present invention.
Figure 13B:
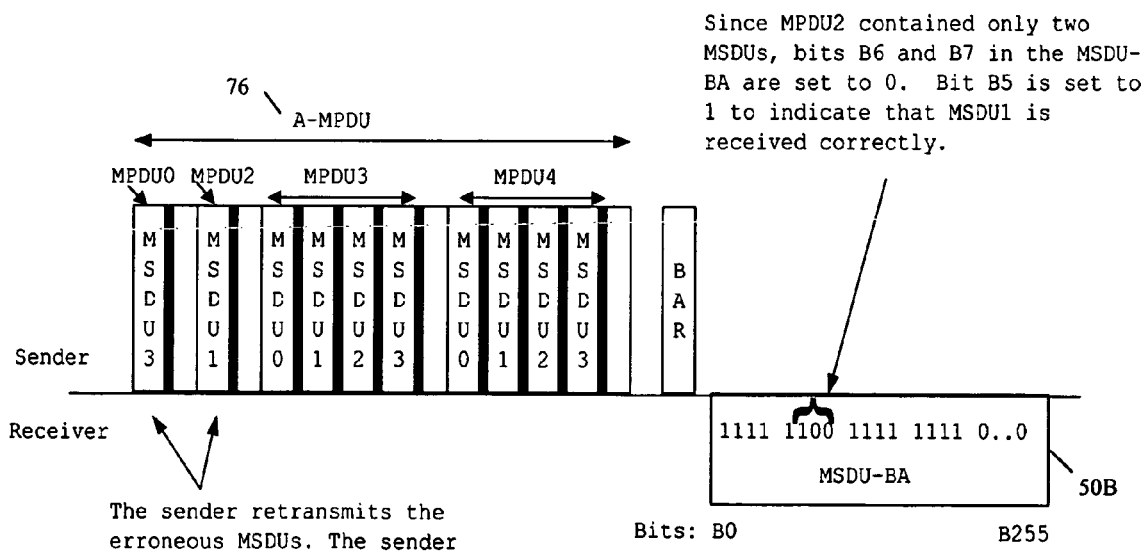

FIGS. 13A-B illustrate further examples of the MSDU-BA scheme according to the present invention. In these examples, the A-MSDU-Size is 4 (i.e., the maximum number of MSDUs that can be aggregated in an A-MSDU is 4). In the example 100 in FIG. 13A, the sender aggregates three MPDUs 60 (i.e., MPDU0, MPDU1 and MPDU2) in an A-MPDU 72. The MPDU2 includes only two MSDUs 64, representing an example of a shorter A-MSDU compared to MPDU0 which includes four MSDUs 64. After transmitting the A-MPDU 72, the sender transmits a BAR frame 74 to request a MSDU-BA 50A from the receiver. The BAR frame 74 includes a BAR control subfield 40 as in FIG. 7, to indicate the A-MSDU-Size of the A-MPDU 72 and signal a MSDU-BA scheme to the receiver.

As shown in FIG. 13A, MSDU3 in MPDU0 and MSDU1 in MPDU2 are received in error. The receiver indicates these errors in a Block Acknowledgement bitmap subfield 54 of a MSDU-BA 50A, which is transmitted to the sender.

After receiving the MSDU-BA 50A, as shown in the example 150 in FIG. 13B the sender selectively retransmits correct copies of the erroneous MSDUs (i.e., MSDU3 in MPDU0, and MSDU1 in MPDU2) in a next A-MPDU 76, to the receiver. The sender is free to include new MPDUs in this next A-MPDU 76. In this example, the sender includes a new MPDU3 and MPDU4 in the A-MPDU 76.

Upon receiving the retransmitted MSDUs (i.e., MSDU3 in MPDU0, and MSDU1 in MPDU2), the receiver indicates successful reception of the retransmitted MSDUs in a MSDU-BA frame 50B. Since MPDU2 contained only two MSDUs, bits B6 and B7 in the Block Acknowledgement bitmap 54 of the MSDU-BA frame 50B are set to 0. This does not create any ambiguity because the sender knows that the exact number of MSDUs was aggregated in an A-MPDU. Further, bit B5 in the MSDU-BA frame 50B is set to 1 to indicate that MSDU1 is received correctly.

Figure 14:
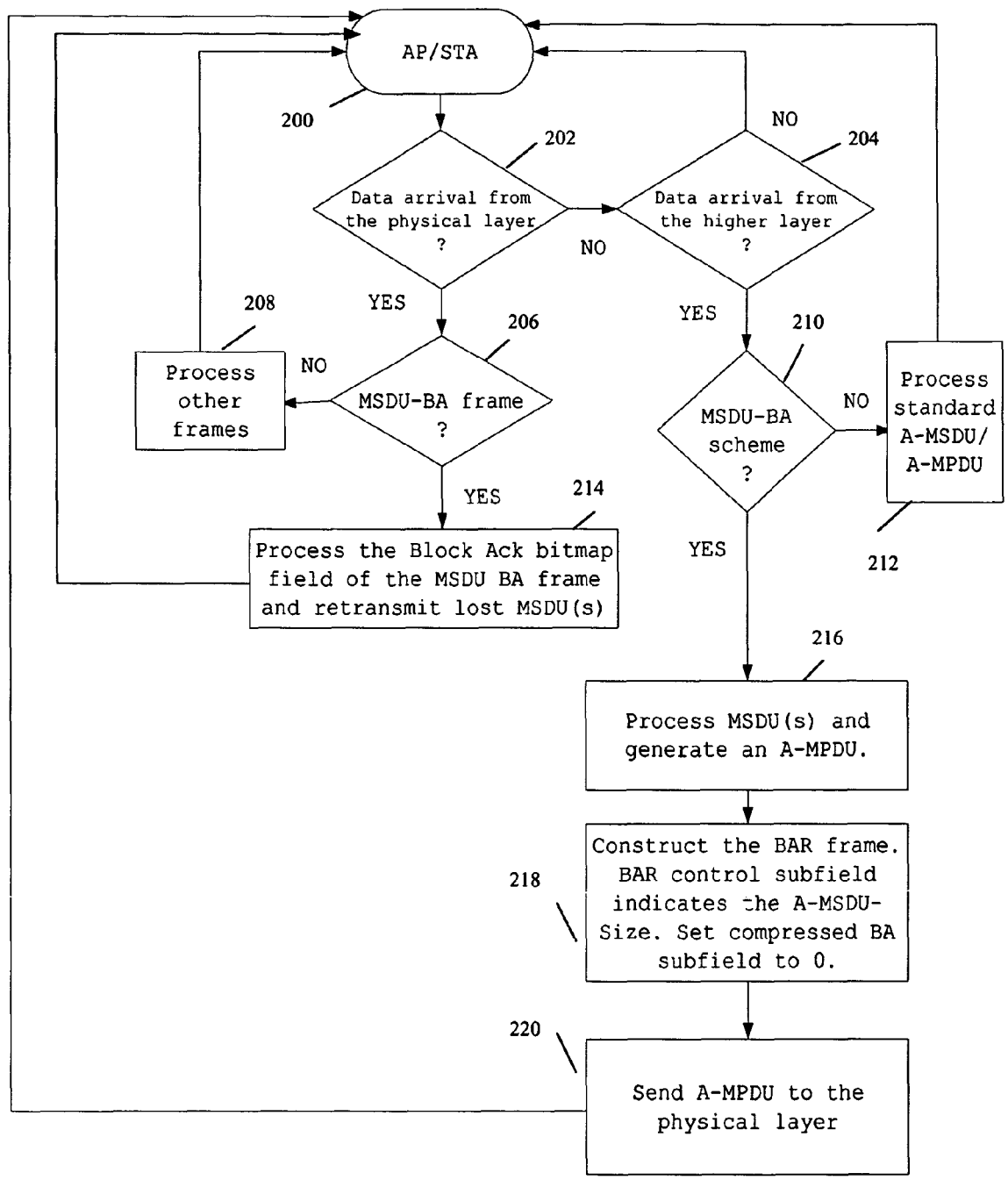
FIG. 14 shows a flowchart of the steps of a communication process implemented by a wireless sender, according to an embodiment of the present invention.

FIG. 14 shows a flowchart of the steps of an example MSDU-BA process 180 implemented in a WLAN including a plurality of wireless communication stations, according to the present invention. A wireless communication station that has the TXOP for transmitting data over a wireless channel is referred to as a sender. A wireless communication station receiving such transmission is referred to as a receiver. Each wireless communication station includes a MAC layer and a PHY layer. The MSDU-BA process 180 includes the steps of:

Step 200—The MAC layer of the sender begins awaiting the arrival of data either from a higher layer for transmission to the receiver, or from the receiver via the PHY layer at the sender.

Step 202—Determine if any data arrived from the PHY layer? If yes, go to step 206, otherwise go to step 204.

Step 204—Determine if any data arrived from a higher layer? If yes, go to step 210, otherwise go back to step 200.

Step 206—Determine if data from the PHY layer includes a MSDU-BA frame 50? This is performed by checking if: (a) the compressed BA subfield 56 and bit B11 of the reserved subfield 58 in the BA control field 54 (FIG. 11), are equal to 0, and (b) bits B3 . . . B10 of the reserved subfield 58 of the BA control field 56 match with the A-MSDU-Size value set in the BAR control field 40 (FIG. 7) of the BAR frame transmitted earlier by the sender. If yes, then the data from the PHY layer includes a MSDU-BA frame 50, so proceed to step 214. Otherwise go to step 208.

Step 208—Process other types of frames (e.g., conventional BA frames) as usual, then go back to step 200.

Step 210—Determine if a MSDU-BA scheme is to be utilized? The sender can use the MSDU-BA scheme MSDU aggregation if it knows that the receiver is capable of supporting the MSDU-BA scheme as well. If a MSDU-BA scheme is to be utilized, then go to step 216, otherwise go to step 212.

Step 212—The sender uses the standard A-MSDU/A-MPDU aggregation schemes for transmitting the arrived data to the receiver, and then goes back to step 200.

Step 214—The sender processes the Block Acknowledgement bitmap field 54 in the arrived MSDU-BA frame 50 (FIG. 10), and selectively retransmits any erroneous MSDUs to the receiver as described. The sender then proceeds back to step 200.

Step 216—The sender processes MSDU(s) in the arrived data from the upper layer, constructs an A-MSDU frame 62 (FIG. 12), and then constructs an A-MPDU frame 72 (FIG. 13A). Go to step 218.

Step 218—The sender constructs a BAR frame 74 (FIG. 13A), including a BAR control subfield 40 (FIG. 7). The bits B3 . . . B10 of the reserved subfield 44 in the BAR control subfield 40 indicate the A-MSDU-Size, and the compressed BA subfield 42 and bit 11 of the reserved subfield 44 are set to 0. Go to step 220.

Step 220—The sender provides the constructed A-MPDU frame 72 and the BAR frame 74 to the PHY layer for transmission to the receiver. Go back to step 200.

Figure 15:
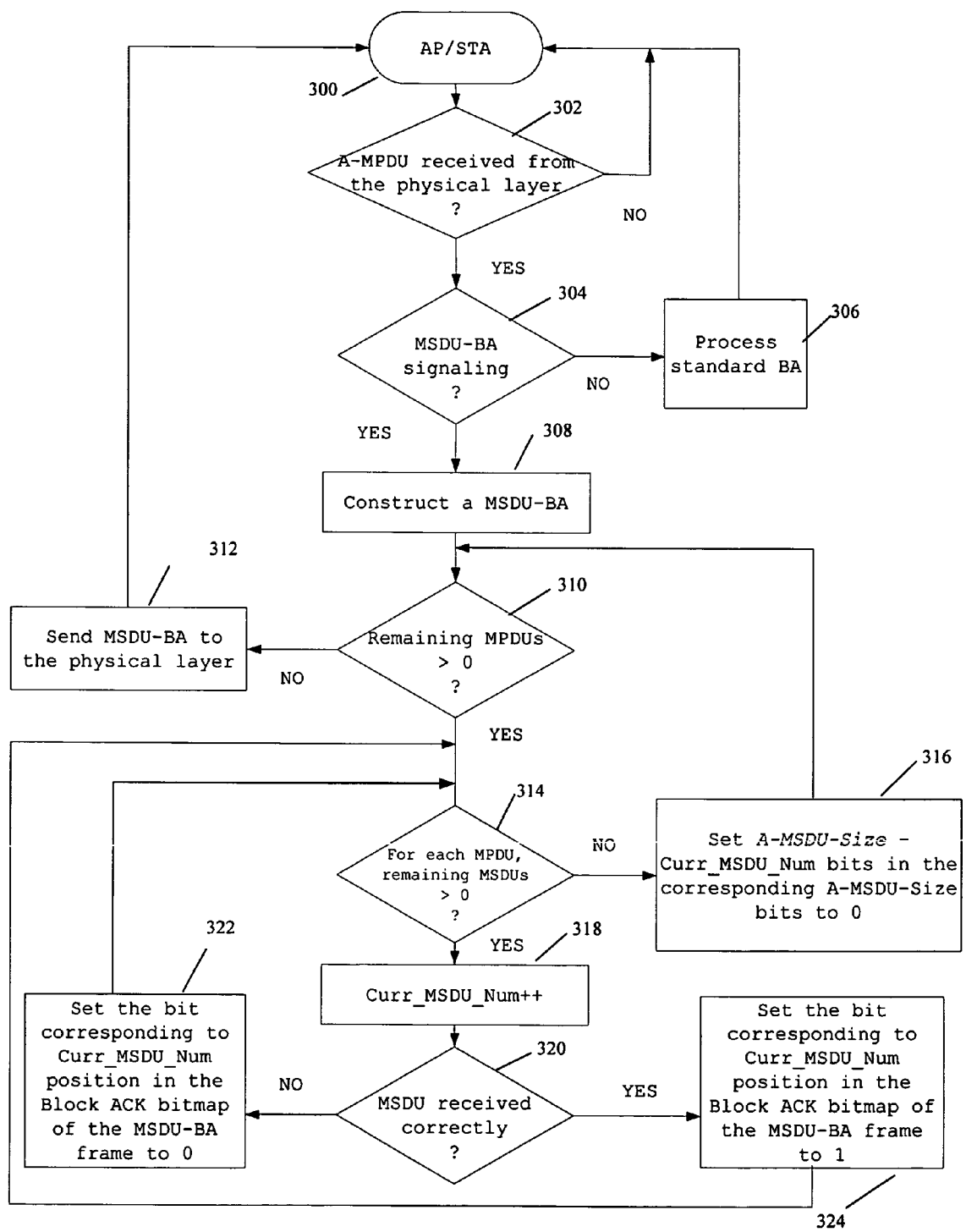
FIG. 15 shows a flowchart of the steps of a communication process implemented by a wireless receiver, according to an embodiment of the present invention.

FIG. 15 shows a flowchart of the steps of a process 250 implemented by a wireless communication station of a WLAN, wherein the wireless communication station functions as a receiver for receiving the A-MPDU frames. The receiver is further capable of supporting the MSDU-BA scheme according to the present invention, for interaction with a sender described in FIG. 14. The receiver replies with a MSDU-BA frame if it detects the presence of a MSDU-BA signaling from the sender, otherwise the receiver replies with a standard (conventional) BA frame. The process 250 in FIG. 15 includes the steps of:

Step 300—The MAC layer of the receiver begins awaiting the arrival of data either from the PHY layer of the receiver.

Step 302—The MAC layer determines if an A-MPDU and a BAR are received from the PHY layer? If not, go back to step 300, otherwise, go to step 304.

Step 304—Determine if a MSDU-BA frame is requested by the sender? This is performed by checking if both the compressed BA subfield 42 and bit B11 in the subfield 44 of the BAR control field 40 (FIG. 7) of the BAR frame are set to 0, and bits B3 . . . B11 in subfield 44 of the BAR control field 40 have non-zero values. If yes, then MSDU-BA signaling is present, initialize the A-MSDU- Size (indicated by bits B3 . . . B10 of the BAR control field 40), and go to step 308. Otherwise, MSDU-BA signaling is not present, go to step 306.

Step 306—Process the standard BA and transmit to the sender. Go back to step 300.

Step 308—Construct a MSDU-BA 50 (FIG. 10) as described.

Step 310—Determine if all of the MPDUs aggregated in the arrived A-MPDU are processed? If not, go to step 314, otherwise go to step 312.

Step 312—All of the MPDUs are processed, send the MSDU-BA 50 to the PHY layer for transmission to the sender. Go to step 300.

Step 314—One or more MPDUs remain pending for processing. Determine if all of the MSDUs aggregated in one A-MSDU as a payload to the MPDU frame (FIG. 12) are processed? If yes, initialize a Curr_MSDU_Num variable to −1 if this is the first MSDU of a MPDU (the Curr_MSDU_Num variable indicates the current number of MSDUs processed in an A-MSDU), and go to step 316. Otherwise, go to step 318.

Step 316—If all of the MSDUs are processed, then set the remaining bits of the corresponding A-MSDU-Size bits in the Block Acknowledgement bitmap field 54 of the MSDU-BA frame 50 to zero. As discussed it is possible that an A-MSDU may include less than the A-MSDU-Size MSDUs. Thus, A-MDSU-Size—Curr_MSDU_Num bits (A-MSDU-Size (minus) Curr_MSDU_Num) in the corresponding A-MSDU-Size Bits are set to 0. Go to step 310.

Step 318—Curr_MSDU_Num++ (increment current MSDU number by one, that is, the number of the MSDU being processed). Go to step 320.

Step 320—Determine if the received MSDU is without error. This is performed by the receiver computing a CRC-32 over the received sub frame 63 (FIG. 12) and compares it against the values stored in the CRC subfield 68. If the two CRC values do not match, indicating an MSDU error, then go to step 322. Otherwise the MSDU was received correctly, go to step 324.

Step 322—Set the bit corresponding to Curr_MSDU_Num position in the chunk of the A-MSDU-size bits of the Block Acknowledgement bitmap field 54 of the MSDU-BA frame 52 to 0. Go to step 314.

Step 324—Set the bit corresponding to Curr_MSDU_Num position in the chunk of the A-MSDU-size bits of the Block Acknowledgement bitmap field 54 of the MSDU-BA frame 50 to 1. Go to step 314.

According to the aforementioned IEEE 802.11n standard, the maximum size of an A-MSDU is 7935 bytes. Based on this constraint, Table 2 below presents the number of MSDUs that can be aggregated in one A-MSDU.

TABLE 2

Maximum number of MSDUs for different applications

| Number | Application | MSDU Size (bytes) | Maximum number of MSDUs aggregated in one A-MSDU of 7935 bytes |
|---|---|---|---|
| 1. | Video Gaming controller | 50 | 115 |
| 2. | VoD control channel | 64 | 95 |
| 3. | VoIP phone | 120 | 57 |
| 4. | HDTV | 220 | 33 |
| 5. | TCP | 300 | 24 |

Performance of a MSDU-BA scheme according to the present invention was simulated using in OPNET (http://www.opnet.com). The effectiveness of the MSDU-BA scheme was calculated using the following metrics:

1. Max end-to-end delay measured in msec: Defined as the maximum latency in delivering a MPEG2-TS packet successfully from an MPEG transmitter to an MPEG receiver during a single session.
2. Average end-to-end delay measured in msec: Defined as the average latency in delivering a MPEG2-TS packet successfully from an MPEG encoder to an MPEG decoder.
3. Percent extra data bytes transmitted in normal BA:

In the event of an error, the normal BA scheme transmits the entire A-MSDU frame. Therefore, this can have significant overhead in terms of redundant data transmission. We define this metric, P, as follows:

$$P=((TBA-TMBA)*100)/TBA$$

Wherein:
P=Percent extra data bytes transmitted in normal BA
TBA=Total data bytes transmitted in normal BA
TMBA=Total data bytes transmitted in MSDU-BA A high quality MPEG2 stream under uniform random bit error rate channel conditions was used as an example. Other simulation parameters are provided in Table 3 below.

TABLE 3

OPNET simulation parameters

| Parameter | Value |
|---|---|
| Block Ack scheme | Normal BA (i.e., conventional BA as per the IEEE 802.11n specifications and MSDU-BA |
| Application data rate | 60 Mbps (CBR stream) |
| MPEG2-TS packet size | 220 bytes |
| A-MSDU-Size | 32, 64, 96, and 128 (variable length A-MSDU) |
| BER (bit error rate) | $5.0 \times 10E{-}6$ and $1.0 \times 10E{-}5$ (uniform random) |
| PHY data rate | 144 Mbps |
| Number of application data streams | 1 |
| A-MPDU aggregation | ON |

The simulation results are now described in relation to FIGS. 16-20.

Figure 16:
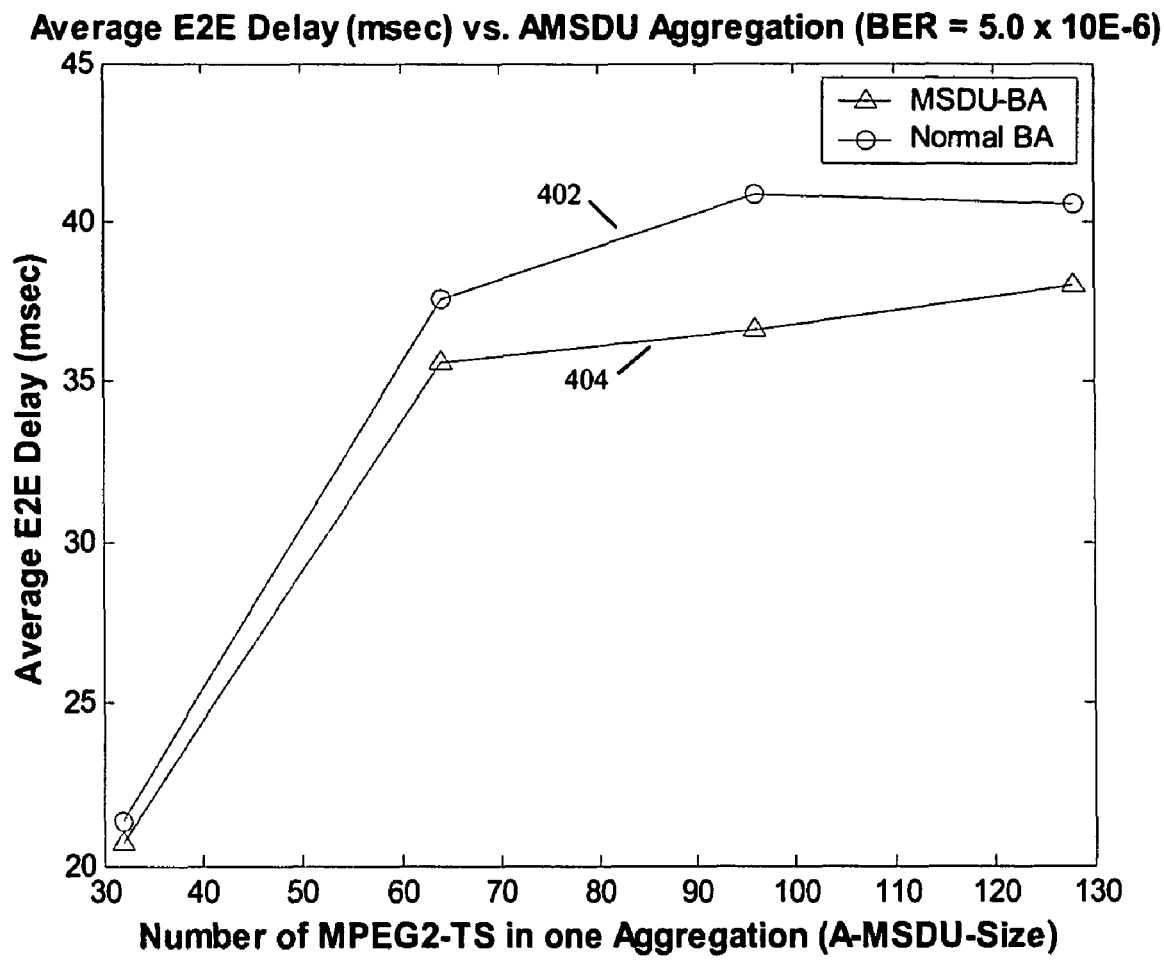
FIG. 16 shows an example of a simulation of an average end-to-end delay as a function of the A-MSDU-Size for BER=5.0×10E-6, according to an embodiment of the present invention.
Figure 17:
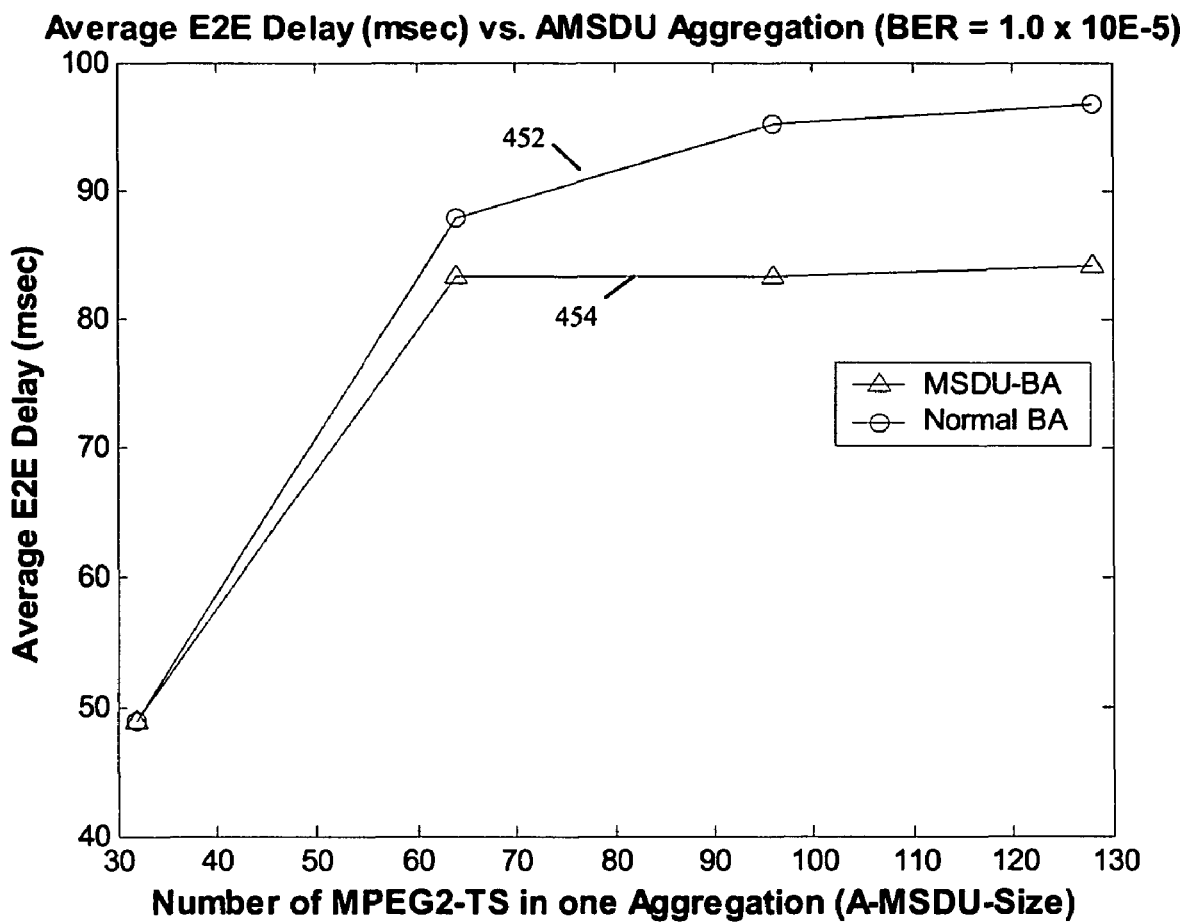
FIG. 17 shows an example of a simulation of an average end-to-end delay as a function of the A-MSDU-Size for BER=1.0×10E-5, according to an embodiment of the present invention.

FIGS. 16 and 17 present average end-to-end delay as a function of the A-MSDU-Size for two different BER (bit error rate) settings. Specifically, FIG. 16 shows the example simulation results 400 for the average end-to-end delay as a function of the A-MSDU-Size for BER=$5.0 \times 10E{-}6$, comparing a normal (conventional) BA performance graph 402 and a MSDU-BA performance graph 404 according to the present invention. Further, FIG. 17 shows the example simulation results 450 for the average end-to-end delay as a function of the A-MSDU-Size for BER=$1.0 \times 10E{-}5$, comparing normal BA performance graph 452 and a MSDU-BA performance graph 454 according to the present invention.

Figure 18:
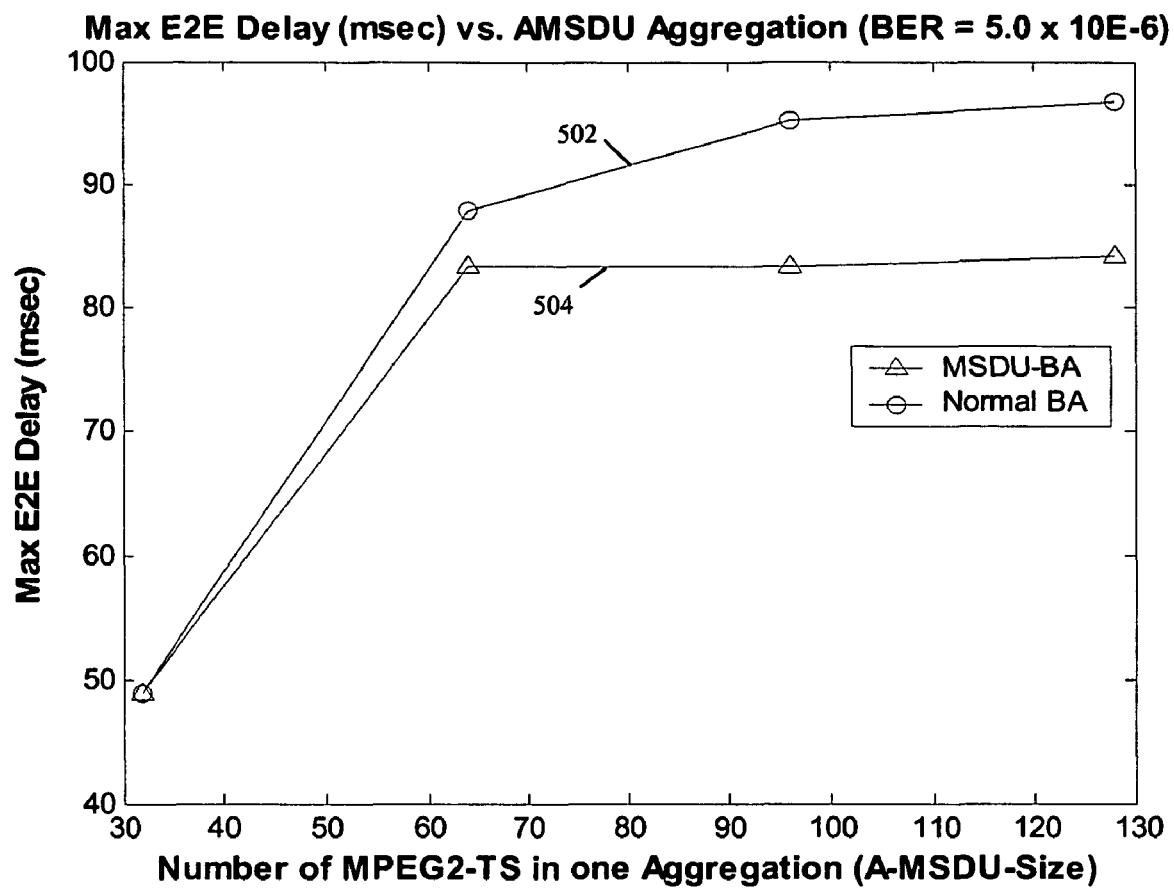
FIG. 18 shows an example of a simulation of a maximum end-to-end delay as a function of the A-MSDU-Size for BER=5.0×10E-6, according to an embodiment of the present invention.
Figure 19:
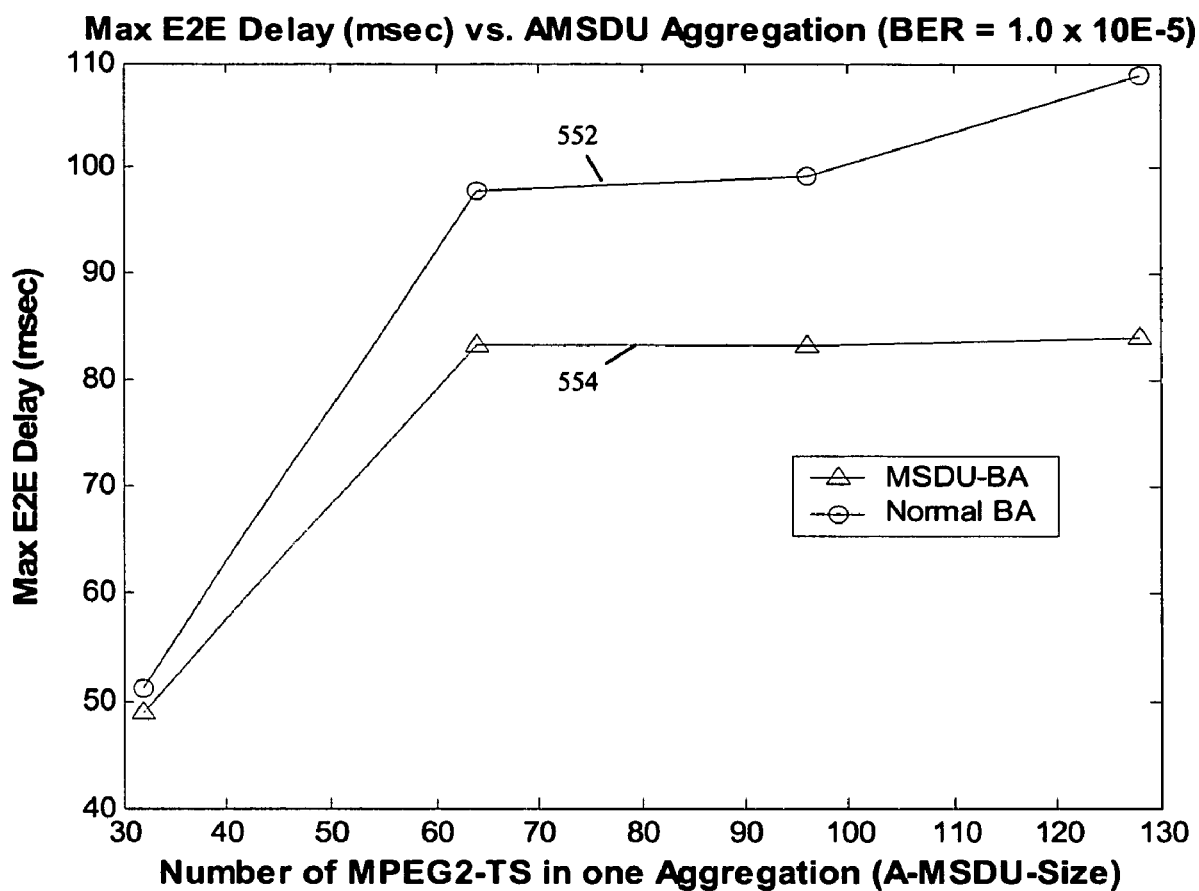
FIG. 19 shows an example of a simulation of a maximum end-to-end delay as a function of the A-MSDU-Size for BER=1.0×10E-5, according to an embodiment of the present invention.

FIGS. 18 and 19 present the maximum end-to-end delay as a function of the A-MSDU-Size for the two different BER settings (i.e., BER=$5.0 \times 10E{-}6$ and BER=$1.0 \times 10E{-}5$). Specifically, FIG. 18 shows the example simulation results 500 for the maximum end-to-end delay as a function of the A-MSDU-Size for BER=$5.0 \times 10E{-}6$, comparing a normal BA performance graph 502 and a MSDU-BA performance graph 504, according to the present invention. Further, FIG. 19 shows the example simulation results 550 for the maximum end-to-end delay as a function of the A-MSDU-Size for BER=1.0×10E-5, comparing a normal BA performance graph 552 and a MSDU-BA performance graph 554, according to the present invention.

Figure 20:
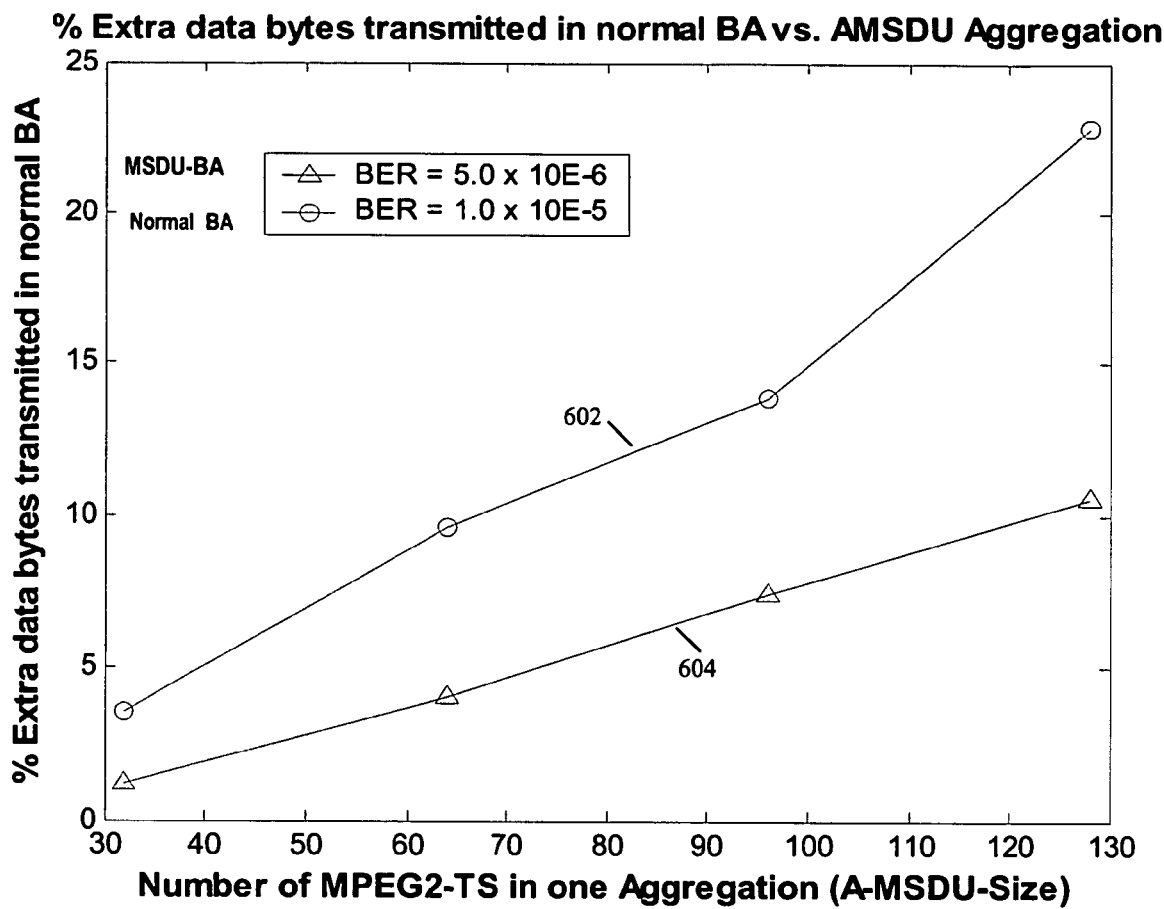
FIG. 20 shows an example of a simulation of data overhead as a function of the A-MSDU for two BER scenarios, according to an embodiment of the present invention.

The example 600 in FIG. 20 show data bytes overhead results as a function of the A-MSDU-Size for the two BER scenarios (i.e., BER=5.0×10E-6 and BER=1.0×10E-5). Specifically, FIG. 20 shows a graph 602 representing example simulation of data overhead as a function of the A-MSDU for a normal BA scheme (with BER=1×10E-5), and a graph 604 representing an example simulation of data overhead as a function of the A-MSDU for a MSDU-BA scheme(with BER=5×10E-6) according to the present invention. For the two different BER setting 5×10E-6 of and 1×10E-5, overhead is compared against the normal BA scheme, according to an embodiment of the present invention.

From the examples in FIGS. 16-20, it can be observed that since a MSDU-BA scheme according to the present invention selectively retransmits erroneous MSDUs, both average and maximum end-to-end delay using the MSDU-BA scheme are smaller than the normal BA scheme. This results in a better quality MPEG2 stream, and hence, improved user satisfaction. Further, the end-to-end delay results of MSDU-BA are insensitive to the A-MSDU-Size. On the other hand, performance of normal BA (conventional BA) sharply degrades as the A-MSDU-Size increases. This is because the probability of MPDU loss increases with the increase in the MPDU size (that is, more MSDUs are aggregated in one A-MSDU, which is the payload to the MPDU frame, as shown in FIG. 12). Furthermore, the normal BA scheme retransmits the whole MPDU. In addition, the normal BA scheme results in 25% extra data bytes transmission, which is significant. This consumes both channel bandwidth and communication power at the sender and the receiver.

Since the MSDU-BA mechanism eliminates unnecessary retransmission of error-free MSDUs, high goodput and high bandwidth utilization is achieved. Further, because erroneous data is retransmitted earlier than is conventional, the quality of service (QoS) of QoS sensitive applications is improved. In addition, as less data is transmitted and received by the sender and the receiver, respectively, communication energy cost is reduced. Further, transmission of both A-MSDUs and non-A-MSDUs (i.e., standard MPDUs) in a single A-MPDU sequence is enabled.

Figure 21:
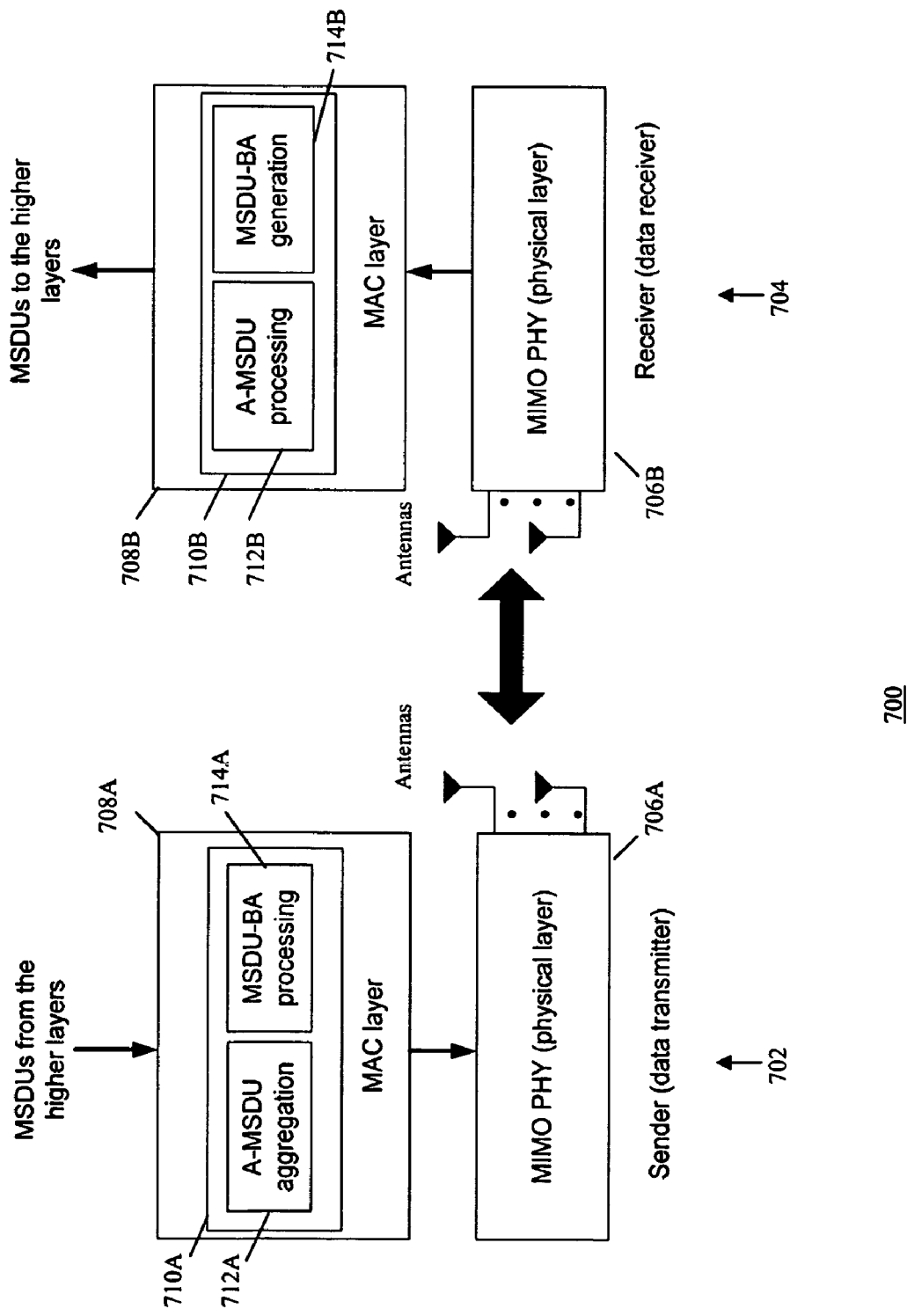
FIG. 21 shows a functional block diagram of a wireless communication system implementing a method of generating a block acknowledgement for an A-MPDU comprising multiple MSDUs in a wireless communication system, according to an embodiment of the present invention.

FIG. 21 shows a functional block diagram of a wireless communication system 700 implementing a method of generating a MSDU-BA frame for an A-MPDU comprising A-MSDUs, according to an embodiment of the present invention. The communication system 700 can be an IEEE 802.11n WLAN that implements an MSDU-BA scheme according to the present invention. The system 700 includes a sender 702 and a receiver 704. Though one sender and one receiver are shown those skilled in the art will recognize that the present invention is useful for multiple senders and receivers.

The sender 702 includes a PHY layer 706A and a MAC layer 708A. The receiver 704 includes a PHY layer 706B and a MAC layer 708B. The PHY layers 706A and 706B implement the IEEE 802.11n standard specified MIMO PHY via multiple antennas.

Figure 2:
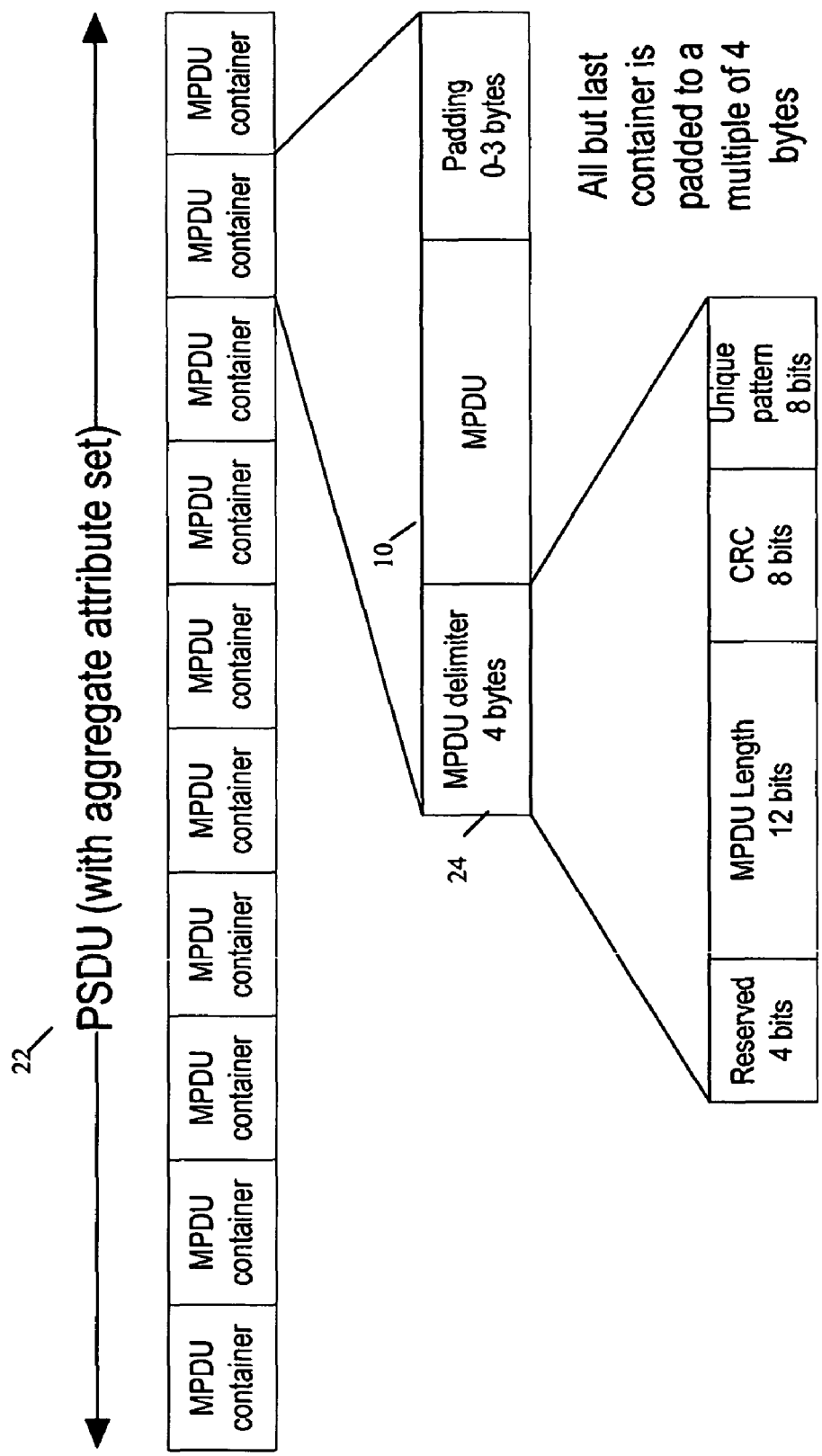
FIG. 2 shows a conventional A-MPDU frame format.
Figure 3:
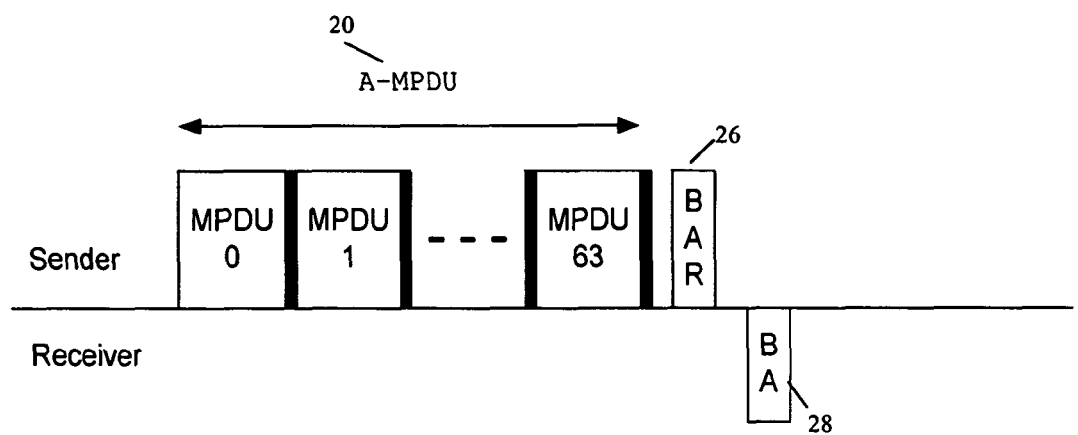
FIG. 3 shows a conventional A-MPDU wireless communication sequence.
Figure 4A:
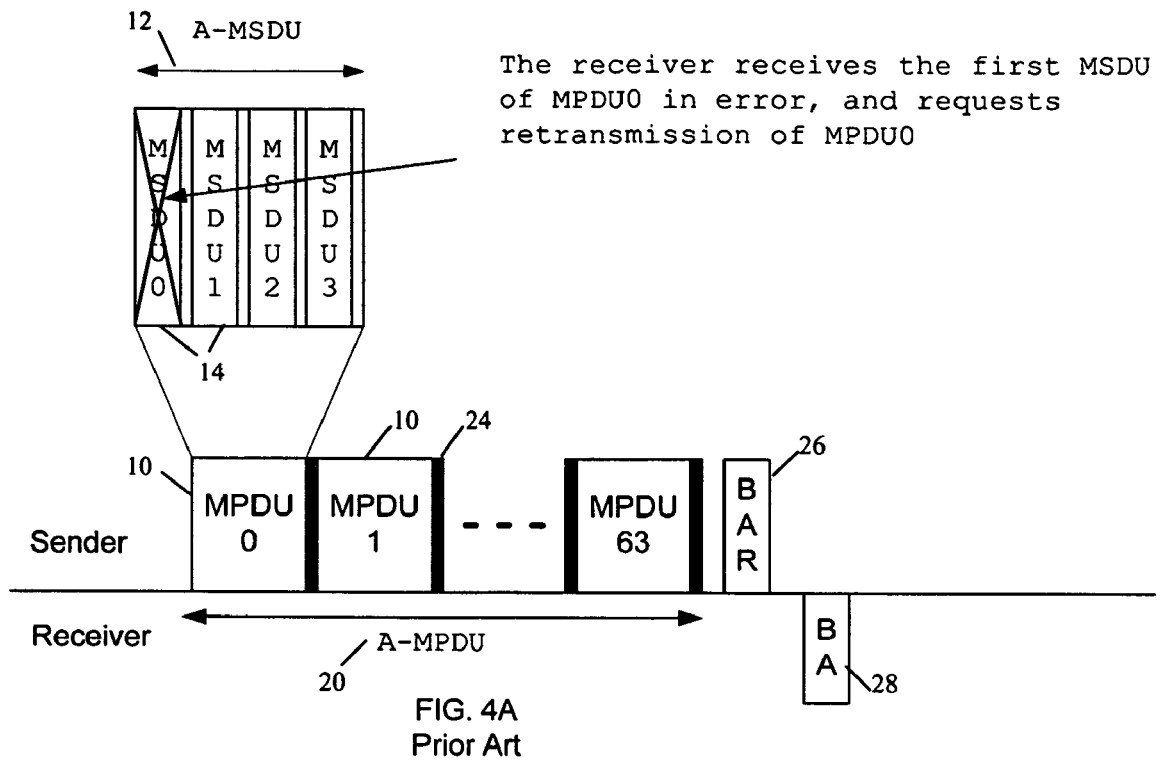
FIGS. 4A-B illustrate drawbacks of the MPDU level acknowledgement when used with a conventional A-MPDU including multiple A-MSDUs.
Figure 4B:
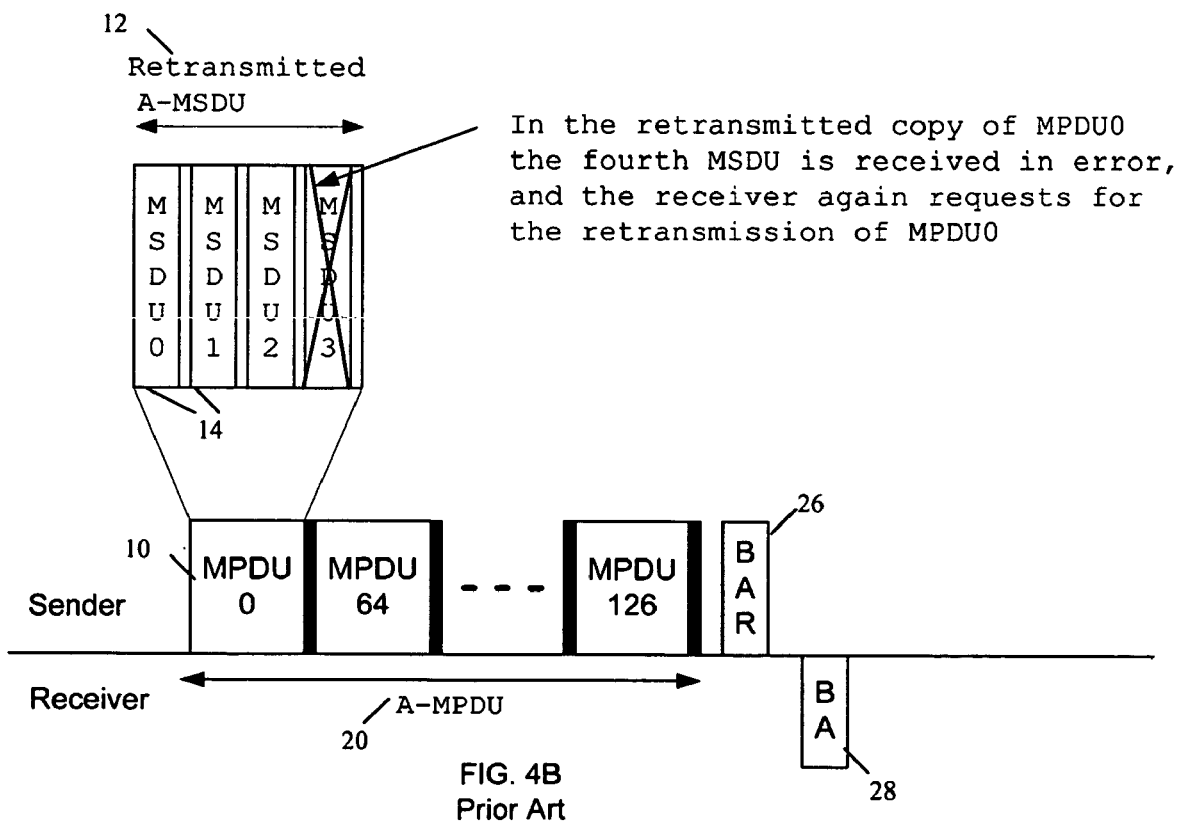

Each MAC layer 708A and 708B, comprises several modules, however, in the example in FIG. 21, for each MAC layer only a A-MSDU module and a MSDU-BA module that implement the above-described methods of the present invention are shown. Specifically, the MAC layer 708A of the sender 702 includes a frame processing module 710A comprising an A-MSDU aggregation module 712A and a MSDU-BA processing module 714A. In one example, the A-MSDU aggregation module 712A and the MSDU-BA processing module 714A implement the steps of the process 180 in FIG. 14. The A-MSDU aggregation module 712A performs a modified A-MSDU aggregation scheme (e.g., the MSDU-BA scheme MSDU aggregation steps 216-220 in FIG. 14) when the sender 702 knows that the receiver 704 is capable of supporting the MSDU-BA scheme. Otherwise, the sender 702 performs normal A-MSDU aggregation and transmits a normal BAR frame to the receiver (FIGS. 1 and 2). Further, the MSDU-BA processing module 714A of the sender 702 selectively retransmits erroneous or corrupted MSDUs when it receives MSDU-BA frames from the receiver 704.

Further, the MAC layer 708B of the receiver 704 includes a frame processing module 710B which comprises an A-MSDU processing module 712B and a MSDU-BA generation module 714B. In one example, the A-MSDU processing module 712B and the MSDU-BA generation module 714B, implement the steps of the process 250 in FIG. 15. The A-MSDU processing module 712B processes the received A-MPDU and BAR frames from the sender 702. The MSDU-BA generation module 714B replies with a MSDU-BA frame (i.e., the MSDU-BA frame 50 indicates the status of individual MSDUs in a received A-MSDU), if the sender 704 detects the presence of MSDU-BA signaling from the sender. Otherwise, the receiver replies with a standard BA frame.

As is known to those skilled in the art, the aforementioned example architectures described above, according to the present invention, can be implemented in many ways, such as program instructions for execution by a processor, as logic circuits, as an ASIC, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of packet communication in a wireless communication system including a sender and a receiver, comprising:
    forming an Aggregated Media Access Control (MAC) Service Data Unit (A-MSDU) from multiple MSDUs;
    transmitting the A-MSDU from the sender to the receiver over a wireless channel including:
        forming an Aggregated MAC Protocol Data Unit (A-MPDU) comprising one or more MPDUs;
        transporting the A-MPDU from the sender to the receiver over a wireless channel;
        generating a Block Acknowledgement Request (BAR) corresponding to the A-MPDU to request a block acknowledgement for the A-MPDU from the receiver, wherein the BAR includes a size subfield indicating the A-MSDU-Size for the corresponding A-MPDU;
    generating a block acknowledge that includes a plurality of acknowledgments corresponding to a plurality of MSDUs in a received A-MSDU;
    transmitting the block acknowledge to the sender; and
    selectively retransmitting each MSDU that requires retransmission as indicated by the corresponding acknowledgment in the block acknowledge.

2. The method of claim 1 wherein the wireless communication system comprises a type of IEEE 802.11n wireless local area network (WLAN).

3. The method of claim 1 wherein the block acknowledge further comprises a Block Acknowledgement bitmap field that includes said plurality of acknowledgments.

4. The method of claim 3 wherein each A-MSDU comprises a sequence of MSDUs that are A-MSDU-Size in number.

5. The method of claim 4 wherein each MSDU in an A-MSDU has a sequence number starting from 0 to an A-MSDU-Size—1 that uniquely identifies that MSDU in the A-MSDU.

6. The method of claim 5 wherein the maximum value of the A-MSDU-Size is 128.

7. The method of claim 5 wherein the A-MSDU includes a MSDU sequence number subfield for each MSDU, allowing the receiver to uniquely identify that MSDU in the A-MSDU.

8. The method of claim 7 wherein the A-MSDU includes a CRC subfield for each MSDU, allowing the receiver to check for successful receipt of that MSDU.

9. The method of claim 7 wherein:
forming an A-MSDU further includes forming an A-MSDU from multiple MSDUs transported in a MPDU;
transmitting the A-MSDU further includes:
transmitting the BAR from the sender to the receiver;
generating a block acknowledge further includes generating a block acknowledge that includes a plurality of acknowledgments corresponding to a plurality of MSDUs in the A-MPDU.

10. The method of claim 9 wherein each MPDU includes a sequence number, allowing the receiver to uniquely identify that MPDU in the A-MPDU.

11. The method of claim 10 wherein the block acknowledge further comprises a Block Acknowledgement bitmap field that includes a plurality of acknowledgment bits corresponding to said plurality of MSDUs.

12. The method of claim 11 wherein generating a block acknowledge further includes:
processing the received A-MPDU to access each MPDU therein;
for each MPDU including an A-MSDU, using a bit in the Block Acknowledgement bitmap field to indicate to the sender whether the corresponding MSDU is successfully received or not.

13. The method of claim 12 wherein said number of bits in the Block Acknowledgement bitmap field is an A-MSDU-Size.

14. The method of claim 13 wherein bit zero starting from the LSB in the Block Acknowledgement bitmap field represents the first MSDU of the first data MPDU in an A-MPDU.

15. The method of claim 1 wherein said size subfield comprises reserved bits of a BAR control field in the BAR for indicating said A-MSDU-Size.

16. The method of claim 9 wherein the Block Acknowledgement bitmap field in a block acknowledge for an A-MPDU has a variable length based on the A-MSDU-Size indicated in the BAR corresponding to that A-MPDU.

17. The method of claim 9 wherein the sender selectively retransmitting further includes the sender selectively retransmitting the indicated MSDUs in a next A-MPDU.

18. The method of claim 9 wherein the BAR includes a signaling subfield based on which the receiver transmits a block acknowledge to the sender instead of a normal BA.

19. The method of claim 18 wherein the signaling subfield is a compressed BA subfield, in a BAR control field of the BAR.

20. The method of claim 5 wherein generating a block acknowledge further includes:
for each MSDU, using the corresponding sequence number of the MSDU to indicate the acknowledgment for that MSDU to the sender in the block acknowledge.

21. The method of claim 10 wherein generating a block acknowledge further includes, for each MSDU:
using the corresponding MSDU sequence number and the MPDU sequence number to indicate the acknowledgment for that MSDU to the sender in the block acknowledge.

22. A wireless communication system comprising:
a wireless transmitter that includes:
an aggregation module that is configured to form an Aggregated Media Access Control (MAC) Service Data Unit (A-MSDU) from multiple MSDUs for transmission to a receiver, and to generate a corresponding Block Acknowledgement Request (BAR) for transmission to the receiver to request a block acknowledgment for the A-MSDU, wherein the BAR includes a size subfield indicating the A-MSDU-Size for a corresponding Aggregated MAC Protocol Data Unit (A-MPDU);
a retransmission module that is configured to selectively only retransmit each MSDU that requires retransmission as indicated by a corresponding block acknowledgment in a block acknowledge from the receiver; and
a wireless receiver that includes:
an A-MSDU processing module that is configured to evaluate MSDUs in a received A-MSDU for correctness; and
an acknowledgment module that is configured to generate a block acknowledge that includes a plurality of acknowledgments corresponding to a plurality of MSDUs in the received A-MSDU, for transmission to the transmitter in response to a BAR from the transmitter.

23. The system of claim 22 wherein the wireless communication system comprises a type of IEEE 802.11n.

24. The system of claim 22 wherein the block acknowledge further comprises a Block Acknowledgement bitmap field that includes said plurality of acknowledgments.

25. The system of claim 24 wherein each A-MSDU comprises a sequence of MSDUs that are A-MSDU-Size in number.

26. The system of claim 25 wherein each MSDU in an A-MSDU has a sequence number starting from 0 to A-MSDU-Size—1 that uniquely identifies that MSDU in the A-MSDU.

27. The system of claim 26 wherein the maximum value of A-MSDU-Size is 128.

28. The system of claim 26 wherein the A-MSDU includes an MSDU sequence number subfield for each MSDU, allowing the receiver to uniquely identify that MSDU in the A-MSDU.

29. The system of claim 28 wherein the A-MSDU includes a CRC subfield for each MSDU, allowing the receiver to check for successful receipt of that MSDU.

30. The system of claim 28 wherein:
the aggregation module of the transmitter is further configured to form at least an A-MSDU from multiple MSDUs transported in a MPDU, and then form an A-MPDU comprising one or more MPDUs, for transmission to the receiver over a wireless channel; and
the acknowledgment module of the receiver is further configured to generate a block acknowledge that includes a plurality of acknowledgments corresponding to a plurality of MSDUs in the A-MPDU.

31. The system of claim 30 wherein each MPDU includes a sequence number, allowing the receiver to uniquely identify that MPDU in the A-MPDU.

32. The system of claim 31 wherein the block acknowledge further comprises a Block Acknowledgement bitmap field that includes a plurality of acknowledgment bits corresponding to said plurality of MSDUs.

33. The system of claim 32 wherein:
the A-MSDU processing module of the receiver is further configured to evaluate the received A-MPDU to access each MPDU therein; and
the acknowledgment module of the receiver is further configured such that, for each MPDU including an A-MSDU, acknowledgment module uses a bit in the Block Acknowledgement bitmap field to indicate to the transmitter whether the corresponding MSDU is successfully received or not.

34. The system of claim 33 wherein said number of bits in the Block Acknowledgement bitmap field is A-MSDU-Size.

35. The system of claim 34 wherein bit zero starting from the LSB in the Block Acknowledgement bitmap field represents the first MSDU of the first data MPDU in an A-MPDU.

36. The system of claim 30 wherein said size subfield comprises reserved bits of a BAR control field in the BAR for indicating said A-MSDU-Size.

37. The system of claim 30 wherein the Block Acknowledgement bitmap field in a block acknowledge for an A-MPDU has a variable length based on the A-MSDU-Size indicated in the BAR corresponding to that A-MPDU.

38. The system of claim 30 wherein the retransmission module of the transmitter is further configured to selectively retransmit the indicated MSDUs in a next A-MPDU.

39. The system of claim 30 wherein the BAR includes a signaling subfield based on which the receiver transmits a block acknowledge to the transmitter instead of a normal Block Acknowledgement (BA).

40. The system of claim 39 wherein the signaling subfield is a compressed BA subfield, in a BAR Control filed of the BAR.

41. The system of claim 26 wherein the block acknowledgment module of the receiver is further configured to generate the block acknowledge such that, for each MSDU, the corresponding sequence number of the MSDU is used to indicate the acknowledgment for that MSDU to the transmitter in the block acknowledge.

42. The system of claim 31 wherein the block acknowledgment module of the receiver is further configured to generate the a block acknowledge such that, for each MSDU, the corresponding MSDU sequence number and the MPDU sequence number are used to indicate the acknowledgment for that MSDU to the transmitter in the block acknowledge.

43. A wireless transmitter comprising:
a physical communication layer;
an aggregation module that is configured to form at least an Aggregated Media Access Control (MAC) Service Data Unit (A-MSDU) from multiple MSDUs for transmission to a receiver via the physical communication layer, and to generate a corresponding Block Acknowledgement Request (BAR) for transmission to the receiver to request a block acknowledgment for the A-MSDU, wherein the BAR includes a size subfield indicating the A-MSDU-Size for a corresponding Aggregated MAC Protocol Data Unit (A-MPDU); and
a retransmission module that is configured to selectively only retransmit each MSDU that requires retransmission as indicated by a corresponding block acknowledgment in a block acknowledge from the receiver.

44. The transmitter of claim 43 wherein the block acknowledge includes a plurality of acknowledgments corresponding to a plurality of MSDUs in the received A-MSDU.

45. The transmitter of claim 44 wherein the block acknowledge further comprises a Block Acknowledgement bitmap field that includes said plurality of acknowledgments.

46. The transmitter of claim 45 wherein each A-MSDU comprises a sequence of MSDUs that are A-MSDU-Size in number.

47. The transmitter of claim 46 wherein each MSDU in an A-MSDU has a sequence number starting from 0 to A-MSDU-Size—1 that uniquely identifies that MSDU in the A-MSDU.

48. The transmitter of claim 47 wherein the maximum value of A-MSDU-Size is 128.

49. The transmitter of claim 47 wherein the A-MSDU includes an MSDU sequence number subfield for each MSDU, allowing the receiver to uniquely identify that MSDU in the A-MSDU.

50. The transmitter of claim 49 wherein the A-MSDU includes a Cyclic Redundancy Checksum (CRC) subfield for each MSDU, allowing the receiver to check for successful receipt of that MSDU.

51. The transmitter of claim 49 wherein the aggregation module is further configured to form at least an A-MSDU from multiple MSDUs transported in a MPDU, and then forms an A-MPDU comprising one or more MPDUs, for transmission to the receiver over a wireless channel.

52. The transmitter of claim 51 wherein each MPDU includes a sequence number, allowing the receiver to uniquely identify that MPDU in the A-MPDU.

53. The transmitter of claim 52 wherein the block acknowledge further comprises a Block Acknowledgement bitmap field that includes a plurality of acknowledgment bits corresponding to said plurality of MSDUs.

54. The transmitter of claim 53 wherein said number of bits in the Block Acknowledgement bitmap field is A-MSDU-Size.

55. The transmitter of claim 54 wherein bit zero starting from the LSB in the Block Acknowledgment bitmap field represents the first MSDU of the first data MPDU in an A-MPDU.

56. The transmitter of claim 51 wherein said size subfield comprises reserved bits of a BAR control field in the BAR for indicating said A-MSDU-Size.

57. The transmitter of claim 56 wherein the Block Acknowledgement bitmap field in a block acknowledge for an A-MPDU has a variable length based on the A-MSDU-Size indicated in the BAR corresponding to that A-MPDU.

58. The transmitter of claim 51 wherein the retransmission module is further configured to selectively retransmit the indicated MSDUs in a next A-MPDU.

59. The transmitter of claim 51 wherein the BAR includes a signaling subfield to signal the receiver to transmit a block acknowledge to the transmitter instead of a normal Block Acknowledgement (BA).

60. The transmitter of claim 59 wherein the signaling subfield is a compressed BA subfield, in a BAR control field of the BAR.

61. A wireless receiver comprising:
a physical communication layer;
an Aggregated Media Access Control (MAC) Service Data Unit (A-MSDU) processing module that is configured to evaluate each MSDU in an A-MSDU received from a transmitter via the physical communication layer, for correctness; and
an acknowledgment module that is configured to generate a block acknowledgment comprising a block acknowledge that includes a plurality of acknowledgments corresponding to a plurality of MSDUs in the received A-MSDU, for transmission to the transmitter in response to a Block Acknowledgement Request (BAR) from the transmitter, wherein the BAR includes a size subfield indicating the A-MSDU-Size for a corresponding Aggregated MAC Protocol Data Unit (A-MPDU).

62. The receiver of claim 61 wherein:
the A-MSDU comprises an aggregation of multiple MSDUs; and
the block acknowledgment allows the transmitter to selectively retransmit each MSDU that requires retransmission as indicated by a corresponding block acknowledgment in the block acknowledge from the receiver.

63. The receiver of claim 62 wherein the block acknowledge further comprises a Block Acknowledgement bitmap field that includes said plurality of acknowledgments.

64. The receiver of claim 63 wherein each A-MSDU comprises a sequence of MSDUs that are A-MSDU-Size in number.

65. The receiver of claim 64 wherein each MSDU in an A-MSDU has a sequence number starting from 0 to A-MSDU-Size—1 that uniquely identifies that MSDU in the A-MSDU.

66. The receiver of claim 65 wherein the maximum value of A-MSDU-Size is 128.

67. The receiver of claim 65 wherein the A-MSDU includes an MSDU sequence number subfield for each MSDU, allowing the receiver to uniquely identify that MSDU in the A-MSDU.

68. The receiver of claim 67 wherein the A-MSDU includes a Cyclic Redundancy Checksum (CRC) subfield for each MSDU, allowing the receiver to check for successful receipt of that MSDU.

69. The receiver of claim 68 wherein the block acknowledge further comprises a Block Acknowledgement bitmap field that includes a plurality of acknowledgment bits corresponding to said plurality of MSDUs.

70. The receiver of claim 69 wherein:
the acknowledgment module of the receiver is further configured to use a bit in the Block Acknowledgement bitmap field to indicate to the transmitter whether the corresponding MSDU is successfully received or not.

71. The receiver of claim 70 wherein said number of bits in the Block Acknowledgement bitmap field is A-MSDU-Size.

72. The receiver of claim 69 wherein said size subfield comprises reserved bits of a BAR control field in the BAR for indicating said A-MSDU-Size.

73. The receiver of claim 69 wherein the Block Acknowledgement bitmap field in a block acknowledge for an A-MPDU has a variable length based on the A-MSDU-Size indicated in the BAR corresponding to that A-MPDU.

74. The receiver of claim 69 wherein the BAR includes a signaling subfield based on which the receiver transmits a block acknowledge to the transmitter instead of a normal Block Acknowledgement (BA).

75. The receiver of claim 74 wherein the signaling subfield is a compressed BA subfield, in a BAR control field of the BAR.

76. The receiver of claim 65 wherein the block acknowledgment module is further configured to generate the block acknowledge such that, for each MSDU, the corresponding sequence number of the MSDU is used to indicate the acknowledgment for that MSDU to the transmitter in the block acknowledge.

77. The receiver of claim 61 wherein the block acknowledgment module is further configured to generate the block acknowledge such that, for each MSDU, the corresponding MSDU sequence number and the MPDU sequence number are used to indicate the acknowledgment for that MSDU to the transmitter in the block acknowledge.

* * * * *